United States Patent
Manapetty et al.

(10) Patent No.: US 7,711,706 B2
(45) Date of Patent: May 4, 2010

(54) REORGANIZING IMAGES IN STATIC FILE SYSTEM DIFFERENCING AND UPDATING

(75) Inventors: Premjith Manapetty, Sunnyvale, CA (US); Jinsheng Gu, Sunnyvale, CA (US)

(73) Assignee: Innopath Software, Inc., Sunnyvale, CA (US)

( * ) Notice: Subject to any disclaimer, the term of this patent is extended or adjusted under 35 U.S.C. 154(b) by 736 days.

(21) Appl. No.: 11/269,277

(22) Filed: Nov. 8, 2005

(65) Prior Publication Data
US 2006/0123032 A1    Jun. 8, 2006

Related U.S. Application Data

(60) Provisional application No. 60/626,252, filed on Nov. 8, 2004, provisional application No. 60/626,292, filed on Nov. 8, 2004, provisional application No. 60/626,293, filed on Nov. 8, 2004.

(51) Int. Cl.
G06F 17/00 (2006.01)
G06F 7/00 (2006.01)

(52) U.S. Cl. .................................. 707/621; 707/625
(58) Field of Classification Search .............. 707/203, 707/101, 200, 201, 202; 717/172; 365/230.03
See application file for complete search history.

(56) References Cited

U.S. PATENT DOCUMENTS

| | | | | |
|---|---|---|---|---|
| 5,274,805 A | * | 12/1993 | Ferguson et al. | 707/7 |
| 5,832,520 A | * | 11/1998 | Miller | 707/203 |
| 6,018,747 A | * | 1/2000 | Burns et al. | 707/203 |
| 6,671,703 B2 | | 12/2003 | Thompson et al. | |
| 7,089,270 B2 | | 8/2006 | Ren et al. | |
| 7,287,068 B1 | * | 10/2007 | Eriksson et al. | 709/221 |
| 7,343,443 B1 | | 3/2008 | Yang | |
| 2002/0065799 A1 | | 5/2002 | West et al. | |
| 2003/0023964 A1 | * | 1/2003 | Rajaram et al. | 717/172 |

(Continued)

FOREIGN PATENT DOCUMENTS

WO    WO/03/025742    *  3/2003

OTHER PUBLICATIONS

Randal Burns, In-Place Reconstruction of Version Differnces, IEEE Transactions on Knowledge and Data Engineering, vol. 15, No. 4, Jul.-Aug. 2003.*

(Continued)

Primary Examiner—James Trujillo
Assistant Examiner—Jeffrey Burke
(74) Attorney, Agent, or Firm—Courtney Staniford & Gregory LLP

(57) ABSTRACT

Systems and methods are provided for reorganizing static file system (SFS) images for efficient differencing, updating and to reduce the update time. The systems and methods are for updating compressed read-only memory file system (CRAMFS) format images as an example. The reorganizing receives an image that includes one or more SFS components such as CRAMFS components and determines any changed sections within the SFS images. Reorganized CRAMFS components are generated using information of the CRAMFS components by moving any of the changed sections from a first position to a second position in the component. The second position can follow all unchanged data sections of the image. A modified image is generated that includes the reorganized CRAMFS component. The modified image is used in SFS differencing and updating.

38 Claims, 20 Drawing Sheets

U.S. PATENT DOCUMENTS

| | | | |
|---|---|---|---|
| 2003/0182414 A1* | 9/2003 | O'Neill | 709/223 |
| 2003/0212712 A1* | 11/2003 | Gu et al. | 707/200 |
| 2004/0062130 A1* | 4/2004 | Chiang | 365/230.03 |
| 2004/0098420 A1* | 5/2004 | Peng | 707/203 |
| 2004/0098427 A1* | 5/2004 | Peng | 707/205 |
| 2004/0243992 A1 | 12/2004 | Gustafson et al. | |
| 2004/0250245 A1 | 12/2004 | Rao et al. | |
| 2005/0010576 A1 | 1/2005 | Ren et al. | |
| 2005/0021572 A1* | 1/2005 | Ren et al. | 707/203 |
| 2005/0132179 A1 | 6/2005 | Glaum et al. | |
| 2006/0075284 A1 | 4/2006 | Skan | |
| 2006/0190939 A1 | 8/2006 | Chen et al. | |
| 2007/0299886 A1* | 12/2007 | Novak | 707/203 |

OTHER PUBLICATIONS

Randal Burns, In-Place Reconstruction of Delta Compressed Files, PODC 1998.*

David Rasch, In-Place Rsync: File Synchronization for Mobile and Wireless Devices, Proceedings of the Freenix Track: 2003 USENIX Annual Technical Conference, Jul. 2003.*

PCT/US05/40388 Form PCT/ISA/220, "PCT Notification of Transmittal of the International Search Report and the Written Opinion of the International Searching Authority, or the Declaration," 1 pg.

PCT/US05/40388 Form PCT/ISA/210, "PCT International Search Report," 2 pgs.

PCT/US05/40388 Form PCT/ISA/237, "PCT Written Opinion of the International Searching Authority," 8 pgs.

PCT/US05/40322 Form PCT/ISA/220, "PCT Notification of Transmittal of the International Search Report and the Written Opinion of the International Searching Authority, or the Declaration," 1 pg.

PCT/US05/40322 Form PCT/ISA/210, "PCT International Search Report," 4 pgs.

PCT/US05/40322 Form PCT/ISA/237, "PCT Written Opinion of the International Searching Authority," 8 pgs.

PCT/US05/40312 Form PCT/ISA/220, "PCT Notification of Transmittal of The International Search Report and the Written Opinion of the International Searching Authority, or the Declaration," 1 pg.

PCT/US05/40312 Form PCT/ISA/210, "PCT International Search Report," 3 pgs.

PCT/US05/40312 Form PCT/ISA/237, "PCT Written Opinion of the International Searching Authority," 11 pgs.

Heterogeneous Harware-Software System Partitioning using Extended Directed Acyclic Graph, Matthew Jin and Gul N. Khan, 16th International Conference on Parallel and Distributed Systems, Aug. 2003 p. 181-186.

Advanced Bash-Scripting Guide, Chapter 12, p. 1-17, published Jul. 26, 2003, from www.archive.org.

* cited by examiner

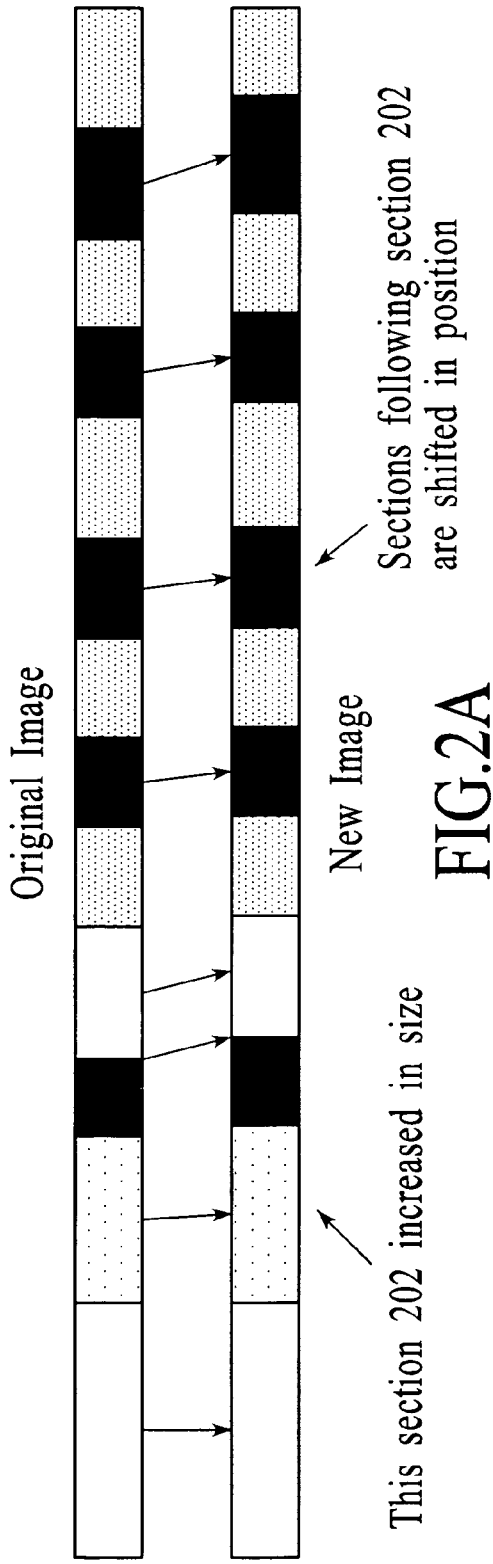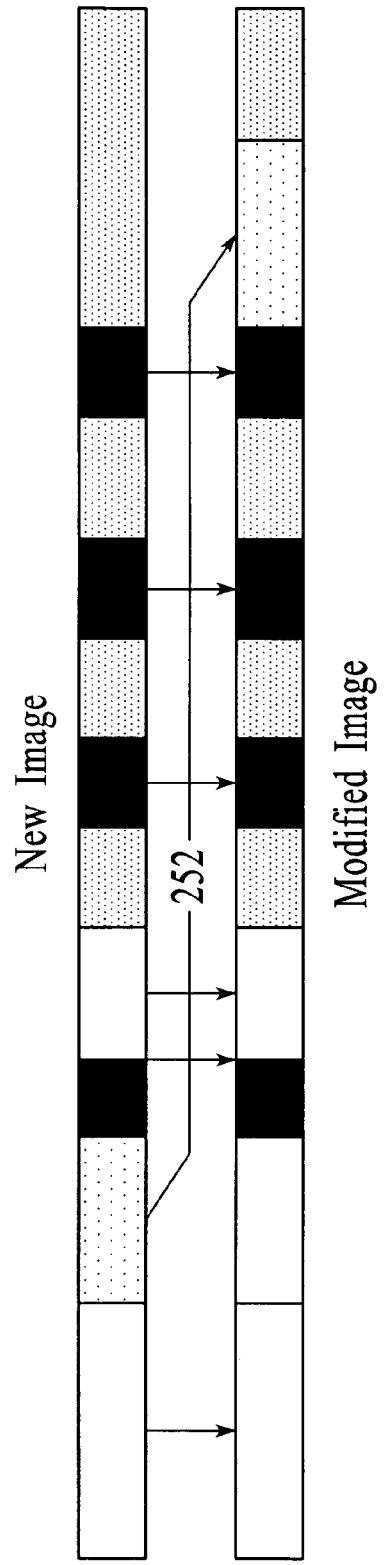

REORGANIZING IMAGES IN STATIC FILE SYSTEM DIFFERENCING AND UPDATING

RELATED APPLICATION

This application claims the benefit of U.S. Patent Application Nos. 60/626,252, 60/626,292, and 60/626,293, all filed Nov. 8, 2004. This application is related to U.S. patent application Ser. No. (11/269,274; entitled "Static File System Differencing and Updating") and Ser. No. 11/269,463; entitled "Updating Compressed Read-Only Memory File System (CRAMFS) Images"), both filed Nov. 8, 2005.

TECHNICAL FIELD

The disclosed embodiments relate to reorganizing images in updating static file system images to reduce the update time and reduce the size of difference files and more particularly updating compressed read-only memory file system (CRAMFS) format images.

BACKGROUND

Software running on a processor, microprocessor, and/or processing unit to provide certain functionality often changes over time and also increases in complexity. The changes can result from the need to correct bugs, or errors, in the software files, adapt to evolving technologies, or add new features, to name a few. In particular, software hosted on mobile processing devices, for example mobile wireless devices, often includes numerous software bugs that require correction. Software includes one or more computer programs, algorithms, files, and/or code pertaining to operation of the host device. Software can be divided into smaller units that are referred to as modules or components.

Portable processor-based devices like mobile processing devices typically include a real-time operating system (RTOS) in which all software components of the device are linked as a single large executable image. Further, file system support has become common recently due to the availability of compact storage and more demanding functionalities in these mobile wireless devices. In addition, the single large image needs to be preloaded, or embedded, into the device using a slow communication link like a radio, infrared, or serial link.

Obstacles to updating the software of mobile processing devices include the time, bandwidth, and cost associated with delivering the updated file to the device, as well as limited resources of the device available for use in updating new files once received. As one example, small changes in one or more sections of a software component result in large changes in a host software image because the small changes cause a shift in position of all unchanged data sections that follow the changed sections. Consequently, there is a need for reducing differences in content between different versions of software resulting from shifts of unchanged data sections caused by content changes of changed data sections.

Incorporation by Reference

Each publication, patent, and/or patent application mentioned in this specification is herein incorporated by reference in its entirety to the same extent as if each individual publication and/or patent application was specifically and individually indicated to be incorporated by reference.

BRIEF DESCRIPTION OF THE FIGURES

FIG. 2A is an example of an original image and a new image prior to CIRT processing.

FIG. 2B is an example of a modified image following repositioning of the changed data section (e.g., section increased in size) by the CIRT, under an embodiment.

Figure 1:
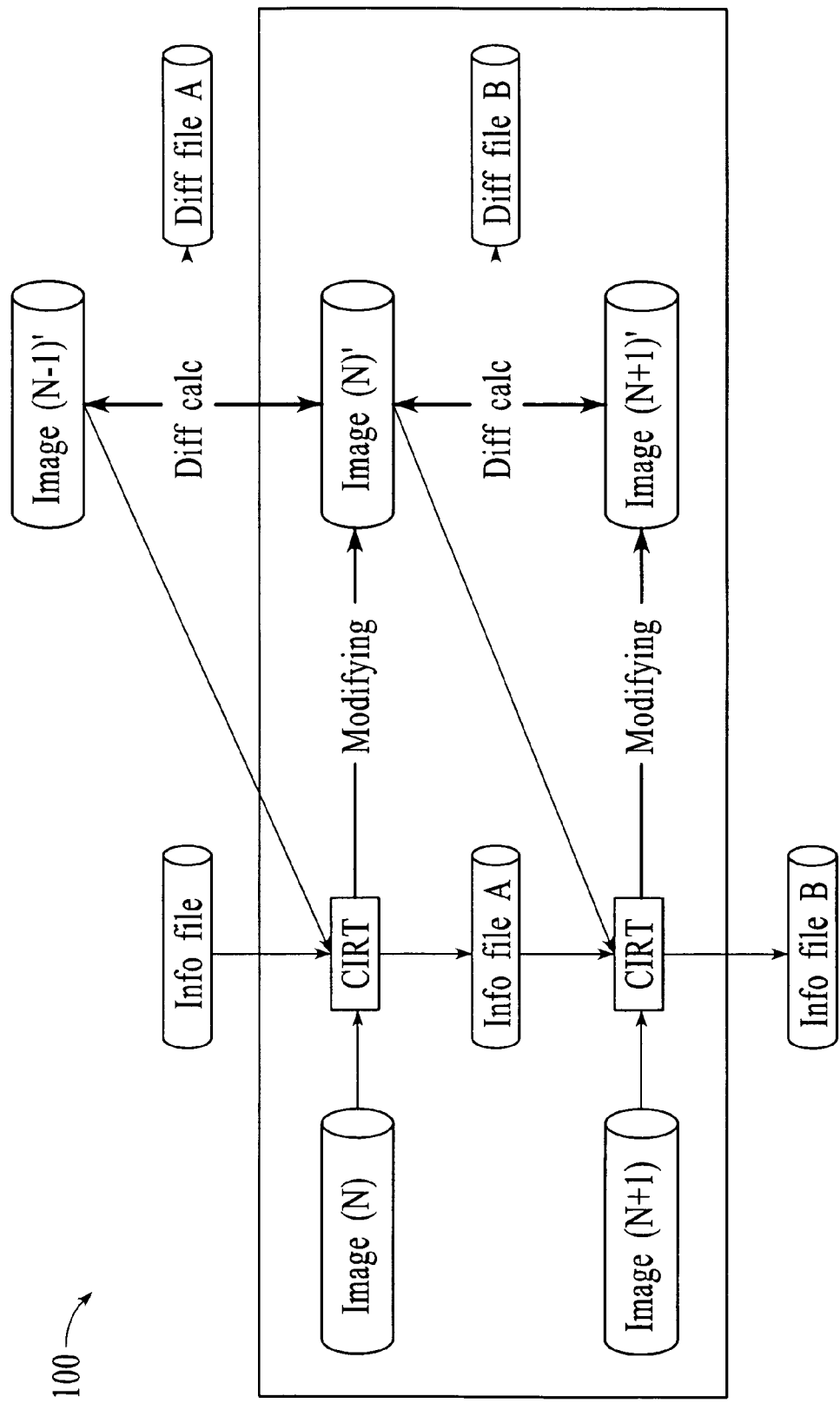
FIG. 1 is a block diagram for file differencing using reorganized (modified) images, under an embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 100 is first introduced and discussed with respect to FIG. 1).

DETAILED DESCRIPTION

Systems and methods are provided for reorganizing static file system (SFS) images for use in determining differences between different software versions that include the images and updating the software versions. The systems and methods for reorganizing are collectively referred to herein as the Image Reorganizing Tool (IRT) but are not so limited. An embodiment of the systems and methods for reorganizing are used to reorganize images that include one or more compressed read-only memory file system (CRAMFS) format components, and these systems and methods for reorganizing are collectively referred to herein as the CRAMFS Image Reorganizing Tool (CIRT). The CIRT may also be referred to herein as a change CRAMFS (CHCRAMFS) tool.

The reorganizing of images that include a CRAMFS component receives an image that includes one or more compressed read-only memory file system (CRAMFS) format components and determines any sections of the CRAMFS components in which the contents or data have changed. Reorganized CRAMFS components are generated using information of the CRAMFS components by moving one or more of the changed sections from a first position to a second position in the CRAMFS component. The second position can follow all unchanged data sections of the image but is not so limited. A modified image is generated that includes the reorganized CRAMFS component, and the modified image is functionally equivalent to the original image. The modified image is used in SFS differencing and updating. Once the image is reorganized to be closer to the original or old version, the header information (e.g., super header CRC, the offset pointers, etc.) are adjusted, so that the resulting image complies with the CRAMFS format specification.

The CRAMFS is a read-only Linux file system used in embedded and small-footprint systems like mobile devices. Unlike compressed images in conventional file systems, a CRAMFS image has individual files compressed separately. Thus if a particular file is accessed, then only that particular file's data needs to be uncompressed. The CRAMFS file system files are zlib-compressed one page at a time to allow random read access. The recent version of the CRAMFS image allows XIP files to be place among the compressed files. The XIP files are not compressed and also they are page aligned on start and end. The meta-data sections (e.g., super header, directory headers, file data headers, etc.) are not compressed, but are expressed in a terse representation that is more space-efficient than conventional file systems.

A SFS, also referred to as a read-only file system, is a file system that can not be modified during run time. Examples of SFSs include but are not limited to the Symbian Z drive (also referred to as the "ROM drive"), the Linux CRAMFS, the encrypted file systems, and file systems that might store operating system executables, built-in applications, essential multimedia information, and default language files, to name a few.

In the following description, numerous specific details are introduced to provide a thorough understanding of, and enabling description for, embodiments of the IRT. One skilled in the relevant art, however, will recognize that the IRT can be practiced without one or more of the specific details, or with other components, systems, etc. In other instances, well-known structures or operations are not shown, or are not described in detail, to avoid obscuring aspects of the IRT.

FIG. 1 is a block diagram for file differencing 100 using reorganized (modified) images, under an embodiment. The file differencing 100 includes the CIRT as an embodiment of the IRT for pre-processing the images prior to differencing operations, as described below. The CIRT pre-processes the images (also referred to as CRAMFS images, CRAMFS ROM images or ROM images), which include at least one CRAMFS component, prior to or simultaneous with package generation by the new software component distributor (NCSD). The pre-processing minimizes the number of flash memory block (e.g., read-only memory) changes required when updating a CRAMFS component.

The CIRT generally modifies the image by repositioning sections of the CRAMFS components in the image in order to reduce the number of updated or changed sections or blocks of the image. The CIRT can use the previous version of the image as the reference image and creates a new image which is equivalent to the original image. In this manner the CIRT reduces the number of updated blocks in the image by reducing or eliminating to the extent possible the ROM block rewrites resulting from content shifts in the image. The CIRT thus reorganizes one or more CRAMFS component(s) in a binary image and uses file system structure information to produce more efficient upgrade packages and faster update times.

The CIRT of an embodiment receives the images (e.g., Image (N), Image (N+1), etc.) and generally examines or evaluates the images for correctness and integrity. The CIRT repositions or rearranges only the changed data sections of the received image and outputs a modified image (e.g., Image (N)', Image (N+1)', etc.) in which the changed data sections have been repositioned, thus leaving the remaining data sections (e.g., unchanged data sections) of the image unaltered. Repositioning of a changed data section of an embodiment leaves the original content of the original version at a location in the modified image that is the same as its location in the original version so that no rewrite of that portion of the original image is required, but the embodiment is not so limited. Following processing by the CIRT, the files and data in the modified images (e.g., Image (N)', Image (N+1)', etc.) are identical to the original images (e.g., Image (N), Image (N+1), etc.), except the location of the changed data sections is different. Moving the changed data sections of the image eliminates the need to rewrite memory blocks when the data contents of the blocks remains unchanged in a new version of the image. In generating a modified image the CIRT of an embodiment optionally uses information of a previous modified image received in an image information file (e.g., Info file A, Info file B, etc.), but is not so limited. The CIRT is described in detail below.

The IRT of an embodiment couples among components of a host computer system (not shown), where the components can include at least one of a processor, a controller, a memory device, and/or a bus, but are not so limited. One or more of the components or modules of the IRT run under control of at least one algorithm, program, or routine. A host computer system processor couples among the components of the host computer system and the components of the IRT under program control. While the components of the IRT/CIRT described herein may be shown as separate blocks, some or all of these blocks can be monolithically integrated onto a single chip, distributed among a number of chips or components of a host system, and/or provided by one or some combination of programs or algorithms. The programs or algorithms when present can be implemented in software algorithm(s), firmware, hardware, and any combination of software, firmware, and hardware.

The term "module" as generally used herein refers to a logically separable part of a program, and is interchangeable with one or more terms including software, algorithm, program, component, and unit. The term "component" as generally used herein refers to one or more of the parts that make up a system; a component may be software and/or hardware and may be subdivided into other components. The terms "module", "component", and "unit" may be used interchangeably or defined to be sub-elements of one another in different ways depending on the context. The term "processor" as generally used herein refers to any logic processing unit, such as one or more central processing units (CPUs), digital signal processors (DSPs), application-specific integrated circuits (ASIC), etc.

FIG. 2A shows an example of an original image and a new image prior to CIRT processing. This example shows how an increase in size of a section 202 of the new image shifts the position of all following sections of the image relative to their position in the original image. FIG. 2B is an example of a modified image following repositioning 252 of the changed data section 202 (section increased in size) by the CIRT, under an embodiment. The CIRT therefore reconfigures or restructures the image to generate or create a modified image that provides for a reduced number of differences in the image when compared to the original image (e.g., byte-to-byte comparison). Repositioning of the changed data section 202 to a spare or reserved space following the unchanged data sections minimizes or eliminates disturbances to the unchanged data sections of the image. The repositioning 252 minimizes or eliminates changes in the image resulting from the increased size of section 202, and thus reduces a size of the corresponding difference file because a fewer number of changes are required to be encoded in the difference file. The modified image, also referred to as the equivalent image, is file-data-wise functionally equivalent to the new image and data-location-wise much closer to the original image than the new image.

The systems and methods of an embodiment define a formula to measure the byte-level closeness between two images as follows:

$$ICF = \frac{N_{same}}{N_{total}}$$

where,

ICF represents the Image Closeness Factor, $N_{same}$ represents the number of bytes that are the same between the two images, and $N_{total}$ represents the total number of bytes in the image.

The higher the value of ICF, the better the images match, therefore the ICF of the modified image is generally higher than the unmodified new image but is not so limited. The embodiments described herein are not limited to the above formula for the ICF and may determine ICF using other formulas or may use factors other than ICF to determine closeness between multiple images.

The CIRT reorganizes or modifies one or more CRAMFS file system components in a binary image (also referred to as a binary ROM image) and by so doing uses file system structure information to produce more efficient upgrade packages. The modified images (e.g., Image (N)', Image (N+1)', etc.) are then processed by the NSCD to produce upgrade packages. This processing includes generating delta files or difference files (e.g., diff file A, diff file B, etc.) that include differences identified or determined between different versions of the modified images (e.g., Image (N)', Image (N+1)'). For example a first difference file (e.g., diff file A) includes differences between modified images Image (N−1)' and Image (N)', and a second difference file (e.g., diff file B) includes differences between modified images Image (N)' and Image (N+1)'.

The upgrade packages update all componentized content of the image not in a CRAMFS component. The upgrade packages also update the file system directory, sub-directory, and file structure, including new, deleted, and repositioned files and directories. The upgrade packages of the NSCD update the file system data content changes resulting from new or deleted files and/or new or deleted directories. The upgrade packages ignore changes to data contents of the CRAMFS component files that result only from the repositioning of files and directories, and do not involve changes to file contents; consequently, the file system structure is updated, but the repositioned file data is ignored since the file contents have not been changed.

Figure 3:
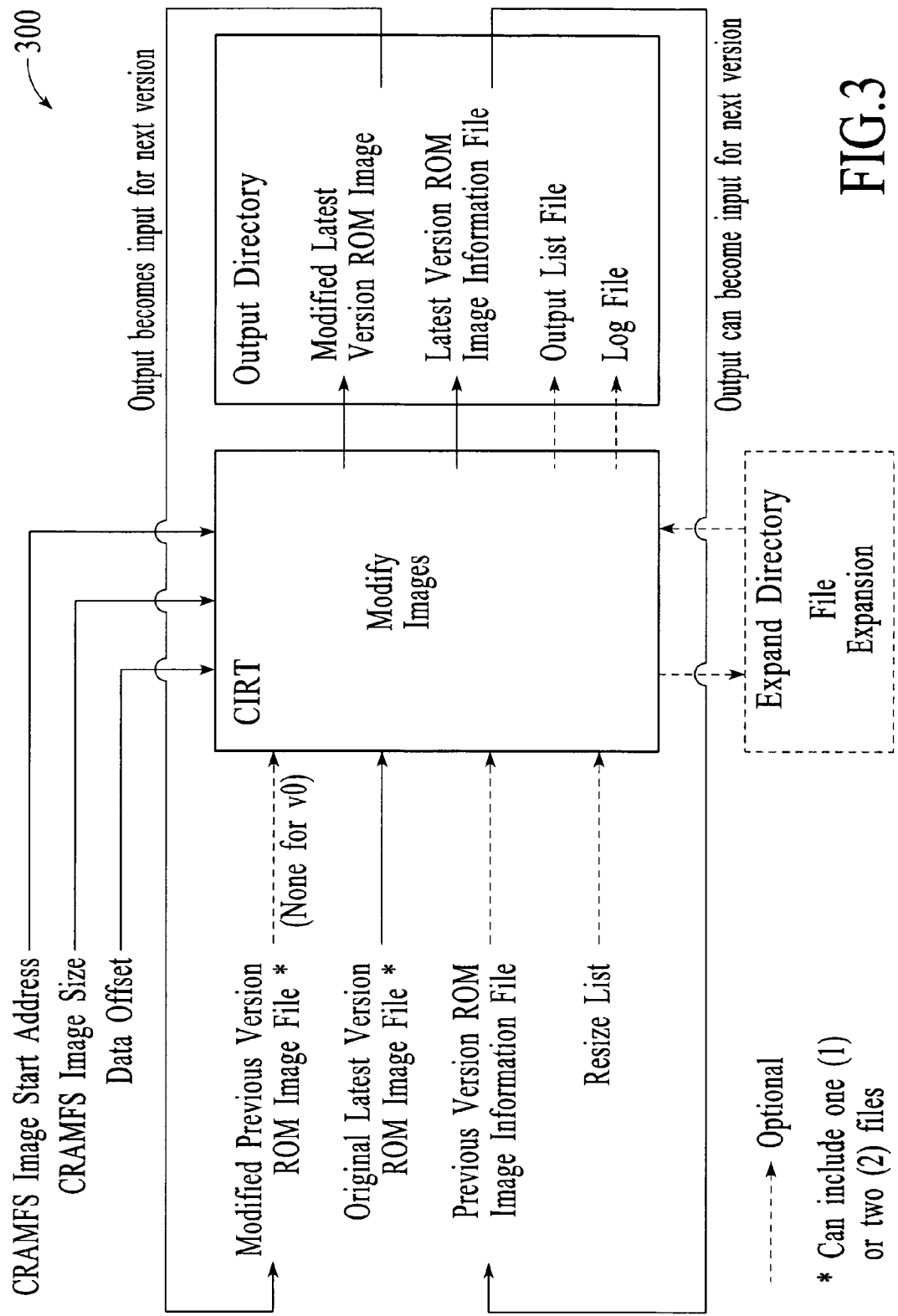
FIG. 3 is a block diagram of the CIRT processing file system images, under an embodiment.

FIG. 3 is a block diagram of the CIRT processing 300 file system images, under an embodiment. The CIRT, using information of the received image files (input files), generates or produces a modified image of the latest software version that can be used to create an upgrade package by the NSCD. The CIRT can also generate or create an image information file for the modified image that is used for processing the next version of the ROM image for the same device model. Because the NSCD uses modified images for two software versions (e.g., version 1 or v1, version 2 or v2, etc.), the CIRT of an embodiment is used twice, in sequence for example, to generate modified images for both versions (e.g., v1 and v2) prior to and/or as a component of differencing operations.

The images received for processing using the CIRT of an embodiment are binary images. The original (e.g., unmodified) image for the corresponding software version should be available (this is referred to herein as the original version or latest version). Further, the input parameter information of the received image is provided to the CIRT as described below. Prior to processing images using the CIRT, the entire image is componentized (including the CRAMFS components) except for code designated not to be upgraded (e.g., boot code). The componentizing allows the images to be supported by a file upgrade system, for example the DeltaUpgrade Plus available from InnoPath Software, Inc. of Sunnyvale, Calif.

When processing all versions of the image after the initial image version, information of the modified image for the previous software version should be available to the CIRT but is optional. Furthermore, the information file for the previous modified version should be available to the CIRT but is also optional, as described below.

Referring to FIG. 3, the CIRT of an embodiment receives numerous input files. The input files received include, but are not limited to, the original latest version ROM image file (can include one (1) or two (2) files), modified previous version ROM image file (can include one (1) or two (2) files) (optional; none for version 0 of the image), and the previous version ROM image information file (optional). The original latest version ROM image file is the unmodified (not reorganized by the CIRT) binary image file for the latest version of the image.

The modified previous version ROM image file, which is an optional input file to the CIRT, is the reorganized binary ROM image file for the version immediately preceding the latest version of the image. The initial version image (e.g., v1) is processed without the modified previous version ROM image file because there is no previous version image. The previous version ROM image information file, which is also an optional input file to the CIRT, is the image information file generated by the CIRT during processing of the corresponding image immediately preceding the latest version.

The CIRT of an embodiment may receive a resize list or resize file as an input file, but the resize list is an optional input file. The resize list is a file that specifies the CRAMFS files within CRAMFS components that are to be increased in size without changing the contents of the CRAMFS files. The CIRT uses information of the resize list to allocate additional memory space to the files specified in the resize list. An example resize list is as follows:

```

#     Format
#     For each entry there needs to be two lines:
#         First line is the filename.
#         Second line is the new size of the file.

#     Comments start with #
#     Empty lines with only a # are allowed: others are not allowed

#     ENTRY 1
prelink.cache
6144

#     ENTRY 2
ld.so.cache
0x1800

```

In this example, the file with filename "prelink.cache" will have 6144 bytes of memory allocated. Similarly, the file with filename "ld.so.cache" will have 0x1800 bytes of memory allocated.

Figure 4:
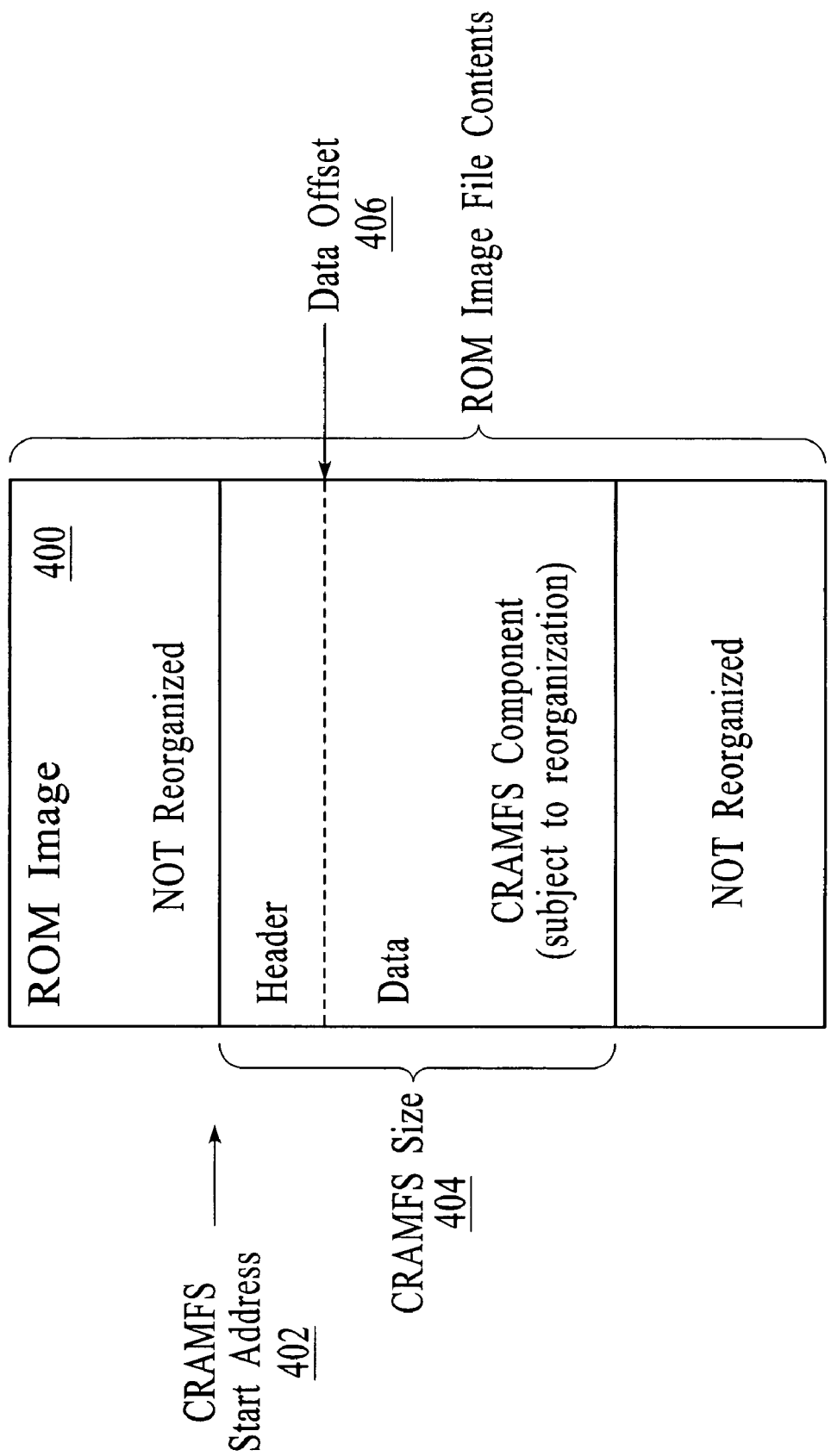
FIG. 4 is a block diagram of a file system image and the corresponding input parameters, under an embodiment.
Figure 5:
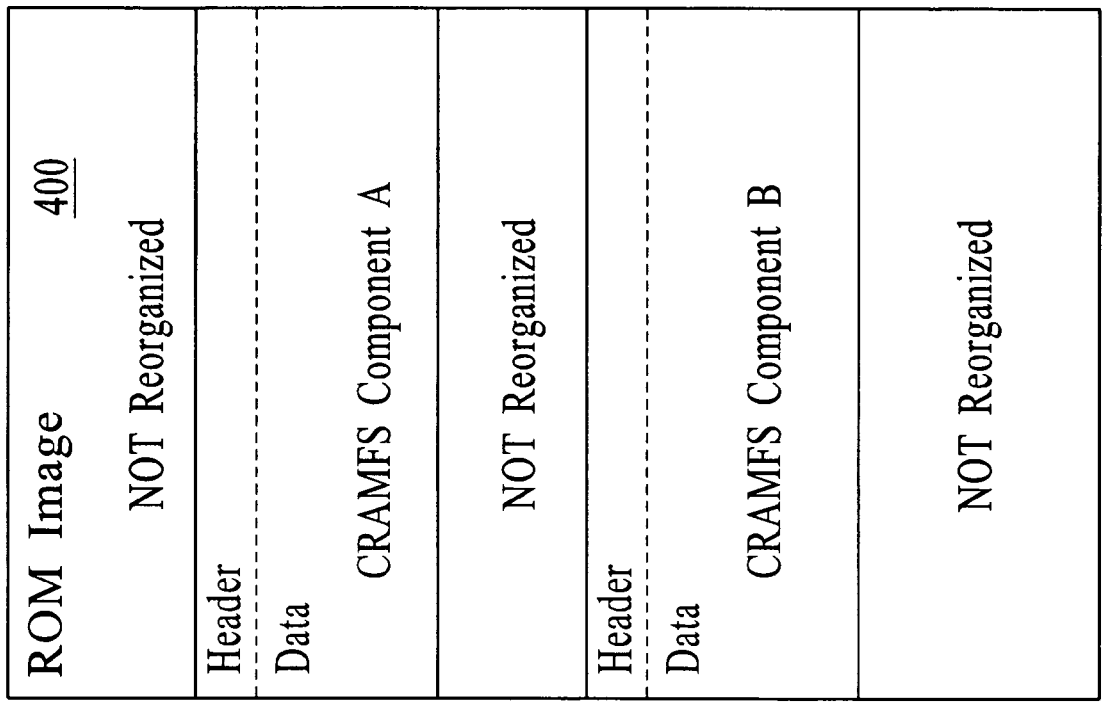
FIG. 5 is a block diagram of an image that includes multiple CRAMFS components.

The CIRT of an embodiment receives input parameters in addition to the input files. The input parameters include information as to the fundamental structure of the image that is to be processed. FIG. 4 is a block diagram of an image 400 and the corresponding input parameters, under an embodiment. The image 400 includes a single CRAMFS component but is not so limited as images processed by the CIRT may have multiple CRAMFS components. As an example, FIG. 5 is a block diagram of an image 500 that includes multiple CRAMFS components A and B. When the image includes multiple CRAMFS components the CIRT of an embodiment sequentially processes and re-processes each of the CRAMFS components, and the component parameters are changed as appropriate to specify each CRAMFS component being processed in turn, as described below. The received images 400 and 500, whether they include single or multiple CRAMFS components, are not limited to including only CRAMFS components and may include other areas or regions (e.g., "NOT Reorganized") that are not processed by the CIRT.

The input parameters of an embodiment, with reference to image 400 of FIG. 4, include a CRAMFS start address 402, CRAMFS size 404, and data offset 406, but are not so limited. The CRAMFS start address 402 is the starting address of the CRAMFS component to be processed. For images with more than one CRAMFS component, the start address specifies the starting address of the component being processed for each stage of the processing. The CRAMFS start address 402 can be obtained from the map extensible markup language (XML) file for the device model.

The CRAMFS size 404 is the number of bytes of the CRAMFS component to be processed. For images with more than one CRAMFS component, the CRAMFS size specifies the size of the component being processed for each stage of the processing. The CRAMFS size 404 can be obtained from the map XML file for the device model.

The data offset 406 is the starting address of the data area of the CRAMFS component to be positioned. This value needs to larger than a sum of the size of the super header and the size of the directory header. This allows for the data sections to be positioned in such a way as to allow for the directory header to grow or shrink between versions. For images with more than one CRAMFS component, the data offset 406 is specified individually for the component being processed in each stage of processing. The data offset 406 is provided to the CIRT only for the first or base version; for subsequent versions the CIRT will use or take the offset value from the previously processed image. If the data offset is not received for the first version processing, then the data sections are positioned just after the directory sections, as is generally done in CRAMFS images.

The processing of image files to generate reorganized or modified images depends, as described above, on the software version of the image and the number of CRAMFS components in the image. Regarding the version of the image, the modified previous version ROM image file and the previous version ROM image information file are not available for initial images. Further, ROM image files for images that include multiple CRAMFS components are processed and reprocessed in order to sequentially modify each CRAMFS component, until such time as all CRAMFS components of the image have been reorganized.

The CIRT of an embodiment initiates generation of modified image files upon receiving a command line but is not so limited. The command line format of an example embodiment is as follows:

```
chcramfs [-v] [-d] [[[-f data_offset] [-r resize_list]]/[-p prev_img[-a i_info]]]
[-b o_info] [-o out_img] [-l list] [-g log_file] [-x xpand_dir] [-s start_addr]
[-z image_size] in_img.
```

The representations of the example command line format are as follows:

- -v[vv]: display small, medium, or large amount of processing information on the user's monitor;
- -f data_offset: the starting address of the data area for the CRAMFS component to be positioned (default: take the data offset from the previous image processed; offset is not altered if the previous image is not provided);
- -r resize_list: pathname of the resize list file used to resize the CRAMFS files (default: not used);
- -p prev_img: pathname of the modified previous version ROM image file;
- -a i_info: pathname of the previous ROM image information file;
- -b o_info: pathname of the latest ROM image information file to be created (default: not created);
- -l list: pathname of the output list file to be created;
- -g log_file: pathname of the log file to be created;
- -x xpand_dir: directory pathname where compressed files are expanded (default: no directory specified; files are expanded in the current directory);
- -s start_addr: the starting address of the CRAMFS component to be processed;

-z image_size: size (bytes) of the CRAMFS component to be processed (default: the image size of the input file CRAMFS file);

in_img: pathname of the original latest ROM image (binary files supported);

-h: display the application command line syntax on the user's monitor; and

-d: only decode the CRAMFS ROM image.

The data offset specifies the memory to be allocated for the CRAMFS header, which contains the directory structure, and file names and location for the device model file system to which the image corresponds, but does not include the file contents. The data offset of an embodiment specifies a memory space large enough to accommodate at least the entire file system header.

Prior to processing the initial (first) versions of a device model image, the correct data offset value is determined by the CIRT of an embodiment. To determine the data offset for initial images, the CIRT initially processes the binary image file using the following parameters and inputs, for example: "chcramfs.exe-vvv-d-x<expansion directory pathname>-s<CRAMFS component starting address>-z<CRAMFS component size><binary image filename>". This processing causes the display of processing information for the data line, for example: "start_dir=0x4C, end_dir=0x35C, start_data=0x35C, end_data=0x1C000, real_end_data=0x1BC8C, file_size=0x3800000". The value for the data offset parameter is determined as the data offset value that is larger than "end_dir" and less than "end_data".

The data offset from the previous version can be retained (by not including the "-f" parameter described above) for use by the CIRT in subsequent processing of later image versions (e.g., V2, V3, V4, etc.). Alternatively, the data offset can be changed by specifying a new data offset value for processing of later ROM image versions.

The CIRT processes the original latest version ROM image and outputs the modified latest version ROM image as described above. Additionally, the CIRT generates a latest version ROM image information file that corresponds to the modified image. The CIRT optionally generates an output list file and/or a log file, but is not so limted.

Figure 6:
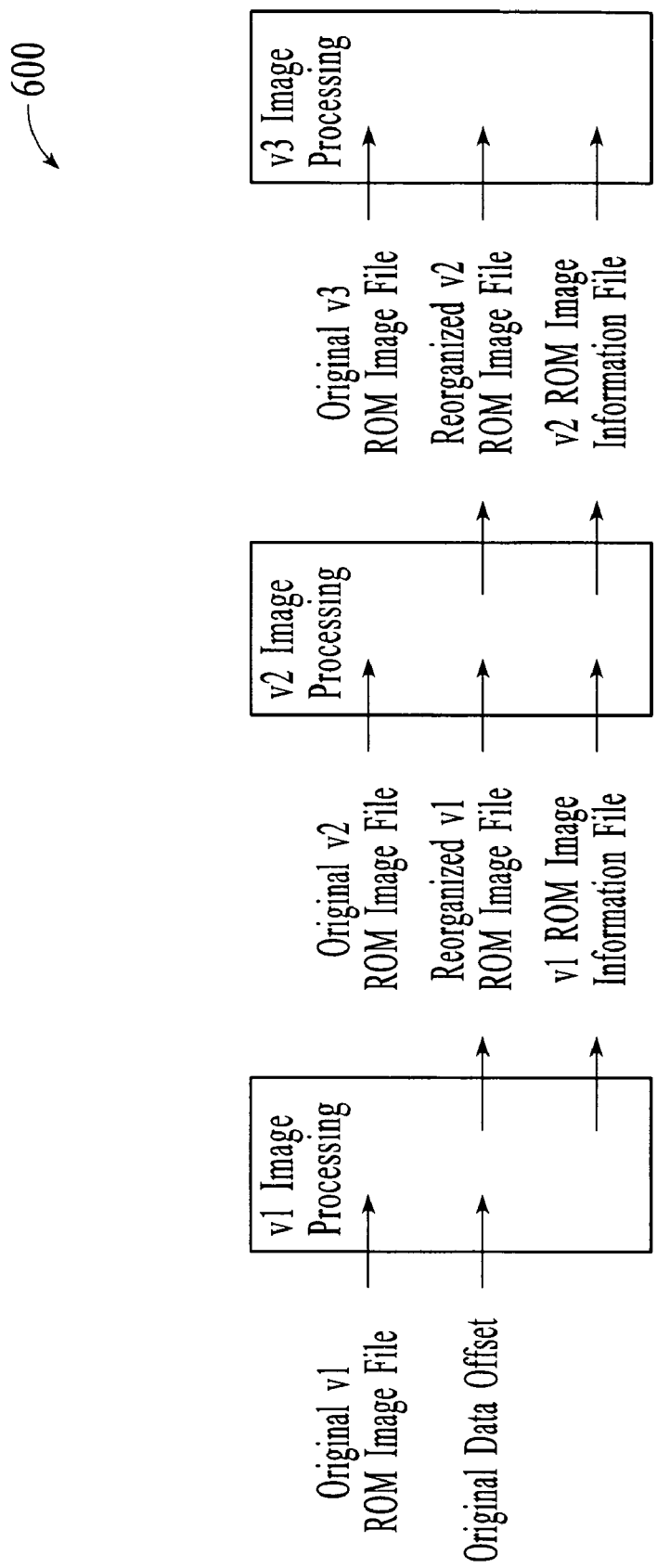
FIG. 6 is a block diagram of image processing when the image includes a single CRAMFS component, under an embodiment.

The CIRT of an embodiment modifies or reorganizes ROM images with one CRAMFS component, as described above. FIG. 6 is a block diagram of image processing 600 when the image includes a single CRAMFS component, under an embodiment. The image processing of this example includes processing of an initial image (v1 Image Processing) followed by processing of two additional versions of the image (v2 Image Processing and v3 Image Processing, respectively), but the embodiment can process any number of image versions and is not limited to processing three (3) versions of an image. Because the NSCD application uses two modified images in order to produce an upgrade package, each modified image is processed in turn. When the image includes only one CRAMFS component for the file system, each image is processed only once. The processing of the initial version of an image (e.g., v1) differs from the processing of subsequent images (e.g., v2, v3, v4, etc.) because there is no version that precedes the initial version.

The CIRT generates an initial modified (e.g., reorganized) image (e.g., v1 Image Processing) by receiving the original (unmodified) image file and determining an initial value for the data offset parameter (-f). The parameters of the CIRT command line are received and the command is executed. The CIRT generates the initial modified CRAMFS image upon execution of the command.

As an example of generating a modified CRAMFS image, an example command is as follows:

```
chcramfs.exe -vv -x.\expend\v1\root_files -f 0x6000
 -b .\output\v1\infov1.bin -o .\output\v1\v1.bin
 -s 0x00360000 -z 0x01CA0000 .\input\v1\v1.bin
```

This example generates a modified CRAMFS image binary file for v1 (e.g., "output\v1\v1.bin") and an associated image information file (e.g., "output\v1\infov1.bin"). This example uses CRAMFS image binary file v1 (e.g., "input\v1\v1.bin") as input and specifies the expansion directory pathname (e.g., expend\v1\root_files"). The input parameters include offset position for data (e.g., 0x6000), starting address of the CRAMFS component (e.g., 0x00360000), and size of the CRAMFS component (0x01CA0000). The option "-vv" generates a medium amount of processing information to help the user monitor CIRT processing activity.

The CIRT of an embodiment generates a subsequent (e.g., v2, v3, etc.) modified image for the image with one CRAMFS component. Generally, the CIRT generates the subsequent modified (e.g., reorganized) CRAMFS image by receiving the original (unmodified) CRAMFS image file for the version being processed. The CIRT also receives the modified (reorganized) CRAMFS image for the version immediately preceding the version being processed. The CIRT further receives image information for the version immediately preceding the version being processed. A determination is made as to whether the data offset is to be changed and, if so, the new value of the data offset that is to be used. The parameters of the CIRT command line are received and the command is executed. The CIRT generates the subsequent modified CRAMFS image upon execution of the command.

As an example of generating a modified CRAMFS image of a later or subsequent version of the image, an example command is as follows:

```
chcramfs.exe -vvv -x .\expend\v2\root_files -f 0x2500
 -a .\output\v1\infov1.bin -b .\output\v2\infov2.bin
 -p .\output\v1\v1.bin -o .\output\v2\v2.bin -s 0x00360000
 -z 0x01B20000 .\input\v2\v2.bin
```

This example generates a modified CRAMFS image binary file for v2 (e.g., "output\v2\v2.bin") and an associated image information file (e.g., "output\v2\infov2.bin"). This example uses CRAMFS image binary file v2 (e.g., "input\v2\v2.bin") as input with the output files from the initial image output (e.g., "output\v1\v1.bin" and "output\v1\infov1.bin"). This example specifies the expansion directory pathname (e.g., expend\v2\root_files"). The input parameters include offset position for data (e.g., 0x2500), starting address of the CRAMFS component (e.g., 0x00360000), and size of the CRAMFS component (0x01B20000). The option "-vvv" generates detailed processing information to help the user monitor CIRT processing activity.

An example follows of the CIRT generating subsequent modified images for an image with one CRAMFS component. The CIRT processes a second version (v2) of an image (v2 Image Processing) by receiving the original (unmodified) CRAMFS image file (Original v2 ROM Image File) for the version (v2) being processed. The CIRT also receives the modified CRAMFS image (Reorganized v1 ROM Image File) for the version (v1) immediately preceding the version (v2) being processed. The CIRT further receives image information (v1 ROM Image Information File) for the version (v1) immediately preceding the version (v2) being processed; the image information of an embodiment is received in an image information file but is not so limited. A determination is made as to whether the data offset is to be changed and, if so, the new value of the data offset that is to be used. The parameters of the CIRT command line are received and the command is executed. The CIRT generates the subsequent modified CRAMFS image (Reorganized v2 ROM Image File) upon execution of the command.

Continuing with the example, the CIRT processes a third version (v3) of the image (v3 Image Processing) by receiving the original (unmodified) CRAMFS image file (Original v3 ROM Image File) for the version (v3) being processed. The CIRT also receives the modified CRAMFS image (Reorganized v2 ROM Image File) for the version (v2) immediately preceding the version (v3) being processed. The CIRT further receives image information (v2 ROM Image Information File) for the version (v2) immediately preceding the version (v3) being processed; the image information of an embodiment is received in an image information file but is not so limited. A determination is made as to whether the data offset is to be changed and, if so, the new value of the data offset that is to be used. The parameters of the CIRT command line are received and the command is executed, and the CIRT generates the subsequent modified CRAMFS image (Reorganized v3 ROM Image File) upon execution of the command.

Figure 7:
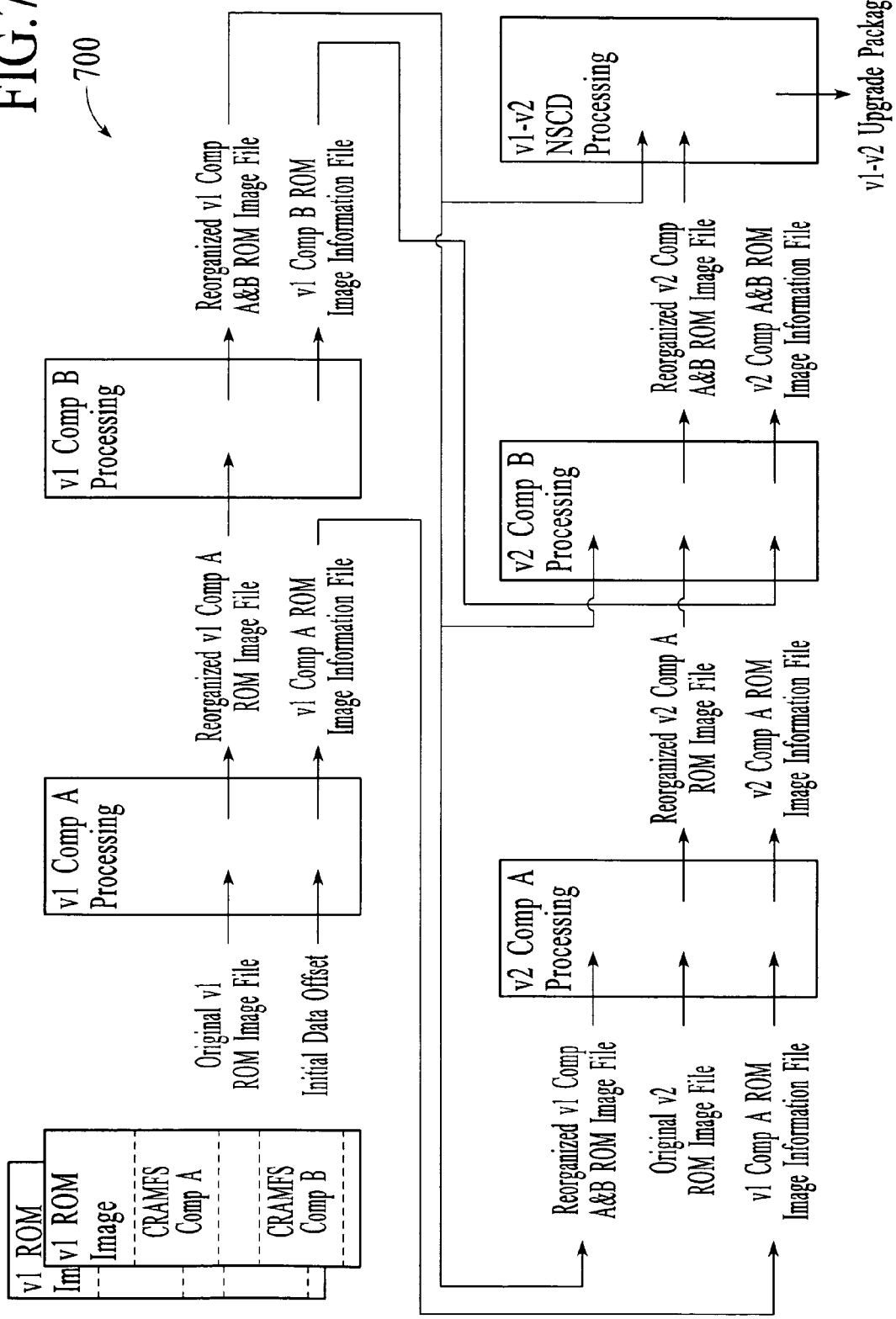
FIG. 7 is a block diagram of image processing when the image includes multiple CRAMFS components, under an embodiment.

The CIRT of an embodiment also modifies or reorganizes ROM images with multiple CRAMFS components, as described above. FIG. 7 is a block diagram of image processing 700 when the image includes multiple CRAMFS components, under an embodiment. The image processing of this example includes processing of an initial version of the image (v1 ROM Image or v1) and one additional version (v2 ROM Image or v2) of the image, where the image includes two (2) CRAMFS components (Comp A and Comp B) but is not so limited. The processing includes processing the initial version of the image (v1) by processing the first CRAMFS component (v1 Comp A Processing) and processing the second CRAMFS component (v1 Comp B Processing) of the initial version (v1). The processing further includes processing the additional version of the image (v2) by processing the first CRAMFS component (v2 Comp A Processing) and processing the second CRAMFS component (v2 Comp B Processing) of the additional version (v2). The embodiment can process any number of image versions having any number of components and is not limited to processing two (2) versions of an image having two (2) CRAMFS components.

Generally, each component of an image is processed in turn and, similarly, each version of an image is processed in turn. To reorganize an image, the received image file is processed and then reprocessed by the CIRT as appropriate to the number of components of the image. During each processing iteration a particular CRAMFS component of the image is specified (e.g., from first to last), and the CIRT reorganizes the specified component as described herein. When all CRAMFS components of an image are reorganized the CIRT outputs an image that includes all reorganized components. Additional versions of the image are processed in order to reorganize the CRAMFS components of the version, with the CRAMFS components of each version processed in turn.

The processing 700 of this example includes an image that includes two components (Comp A and Comp B). The components are processed in turn but are not so limited. Consequently, the processing 700 begins with processing of the first component of the first version (v1 Comp A Processing). The CIRT receives the original (unmodified) image file (Original v1 ROM Image File) along with one or more input parameters. The input parameters as described above include or specify a CRAMFS start address, CRAMFS size, and data offset of the first component Comp A, but are not so limited. The CIRT processing (v1 Comp A Processing) generates a first modified image (Reorganized v1 Comp A ROM Image File) that includes a reorganized version of the first component (Comp A). The processing (v1 Comp A Processing) also generates and outputs an image information file (v1 Comp A ROM Image Information File) corresponding to the reorganized image file.

The processing 700 continues with processing of the second component (v1 Comp B Processing). The CIRT receives the reorganized image file (Reorganized v1 Comp A ROM Image File) along with input parameters that include or specify a CRAMFS start address, CRAMFS size, and data offset of the second component Comp B. The CIRT processing (v1 Comp B processing) generates a second modified image (Reorganized v1 Comp A&B ROM Image File) that includes a reorganized version of both the first component (Comp A) and the second component (Comp B). The processing (v1 Comp B Processing) also generates and outputs an image information file (v1 Comp B ROM Image Information File) corresponding to the reorganized image file.

The processing 700 of this example continues with processing of a second version of the image (Original v2 ROM Image File) that includes two components (Comp A and B). The components are processed in turn so the first component Comp A is processed first. The processing (v2 Comp A Processing) receives inputs that include but are not limited to the original (unmodified) second version (Original v2 ROM Image File), the reorganized initial image (Reorganized v1 Comp A&B ROM Image File), and the image information file of the a first modified image of the initial version (Reorganized v1 Comp A ROM Image File). The CIRT also receives input parameters that include or specify a CRAMFS start address, CRAMFS size, and data offset of the first component Comp A of the second version (v2). The CIRT processing (v2 Comp A processing) generates a first modified image (Reorganized v2 Comp A ROM Image File) that includes a reorganized version of the first component (Comp A) of the second version (v2) of the image. The processing (v2 Comp A Processing) also generates and outputs an image information file (v2 Comp A ROM Image Information File) corresponding to the reorganized image file.

The processing 700 continues with processing of the second component of the second version (v2 Comp B Processing). The CIRT receives the reorganized image file of the second version (Reorganized v2 Comp A ROM Image File) along with the image information file (v1 Comp B ROM Image Information File) corresponding to the second modified image of the first version and the image information file of the first modified image of the initial version (Reorganized v1 Comp A ROM Image File). The CIRT also receives input parameters that include or specify a CRAMFS start address, CRAMFS size, and data offset of the second component Comp B of the second version (v2). The CIRT processing (v2 Comp B Processing) generates a second modified image (Reorganized v2 Comp A&B ROM Image File) that includes a reorganized version of both the first component (Comp A) and the second component (Comp B). The processing (v2 Comp B Processing) also generates and outputs an image information file (v2 Comp A&B ROM Image Information File) corresponding to the reorganized image file.

The NSCD uses the reorganized images of the first version and the second version to determine differences in content between the versions. The NSCD Processing thus receives for example the Reorganized v1 Comp A&B ROM Image File and the Reorganized v2 Comp A&B ROM Image File. The NSCD Processing determines content or data differences between the two versions of the image by determining differences between the modified image of the first version and the modified image of the second version using information of the modified image files.

Figure 8:
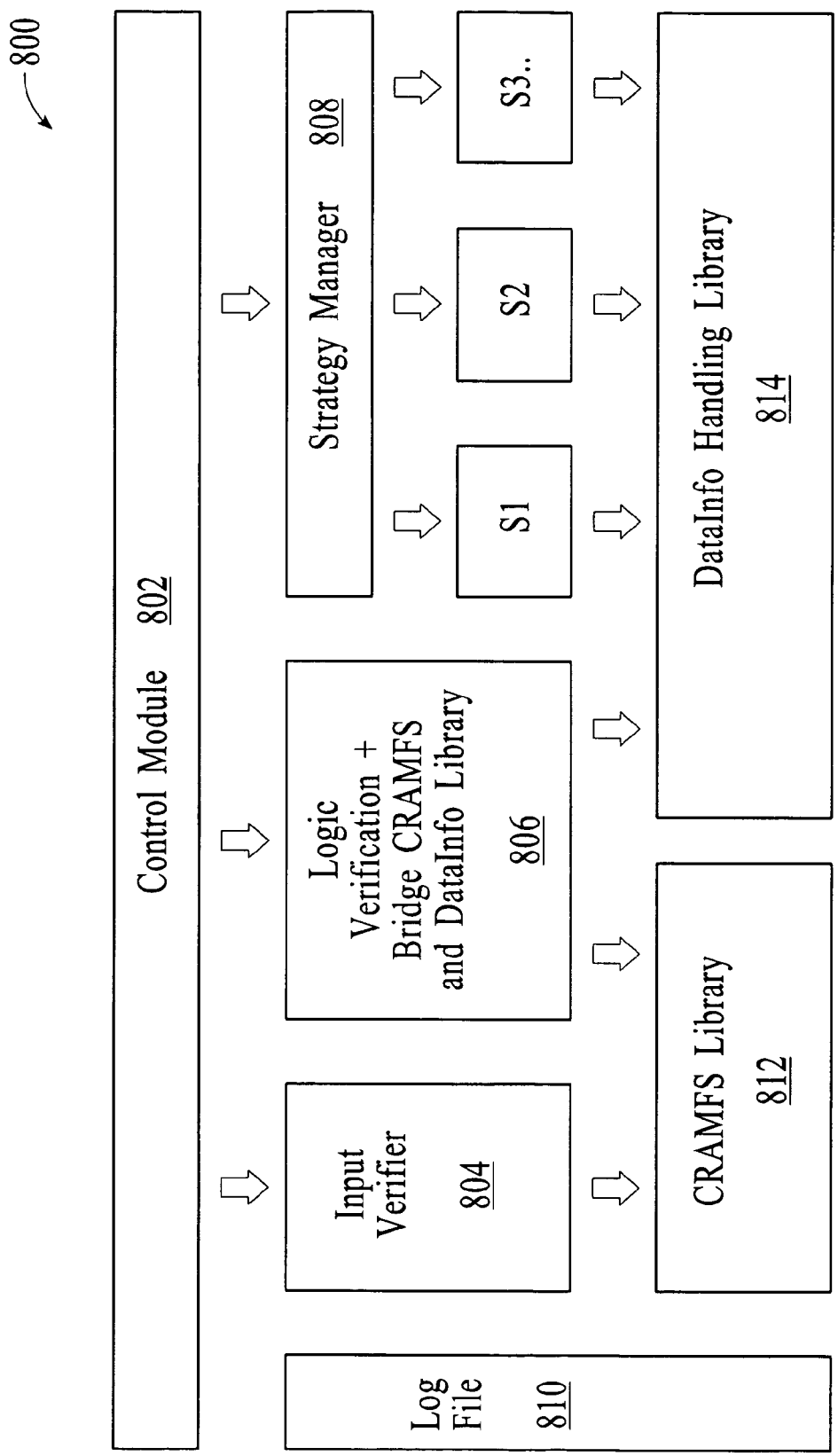
FIG. 8 is block diagram of the CIRT, under an embodiment.

FIG. 8 is block diagram of the CIRT 800, under an embodiment. The CIRT 800 includes components that comprise one or more of a control module 802, input verifier 804, logic verification and bridge CRAMFS and DataInfo library 806, strategy manager 808, a number of strategies (e.g., S1, S2, S3, etc.) (e.g., repositioning logic) under control of the strategy manager 808, a log file 810, a CRAMFS library 812, and a DataInfo handling library 814.

Figure 9:
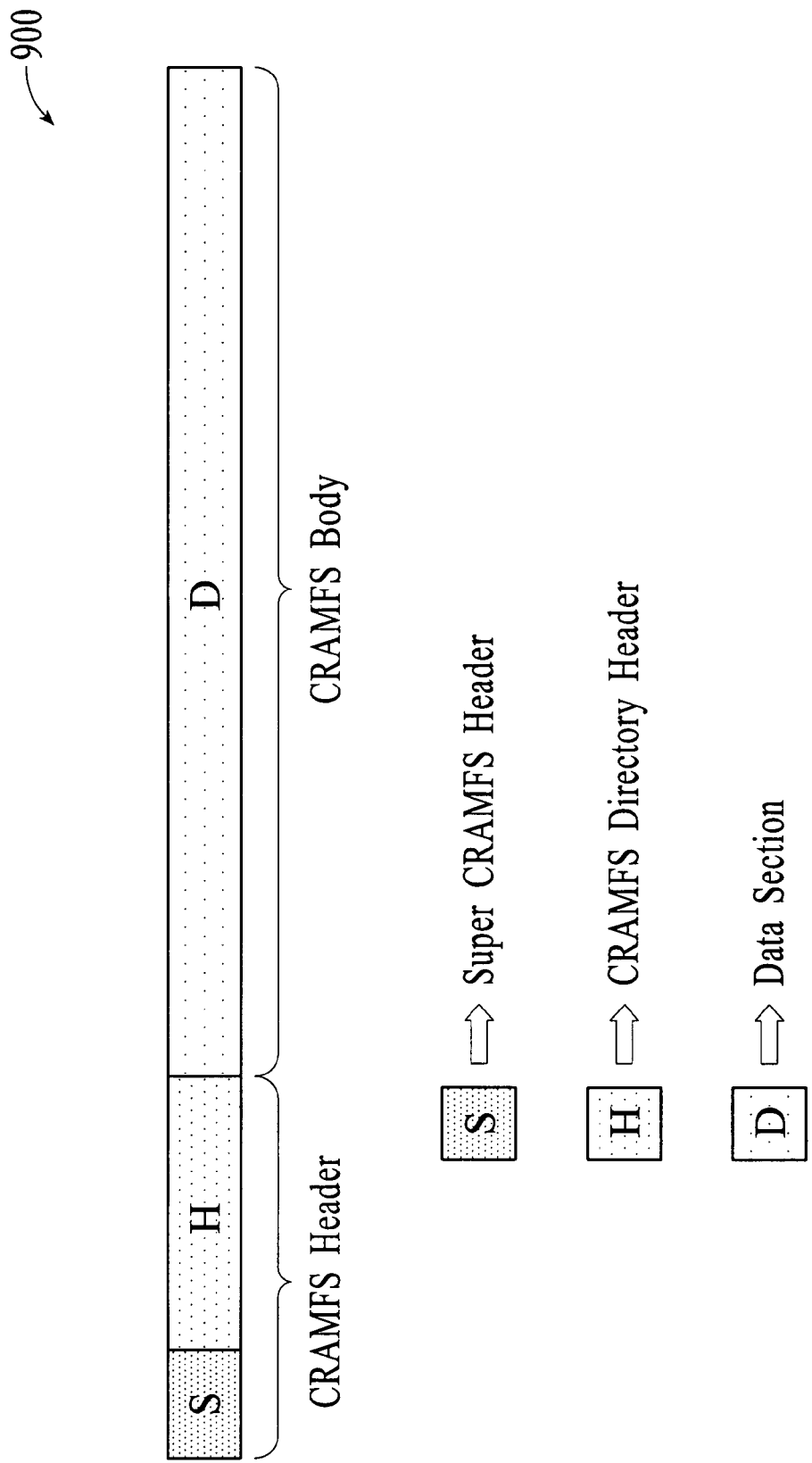
FIG. 9 is an example of a received CRAMFS image, under an embodiment.

The components of the CIRT 800 receive and read an input image, and verify or validate the input image and the input parameters for completeness and correctness. FIG. 9 is an example of a received CRAMFS image 900, under an embodiment. The CRAMFS image 900 includes a CRAMFS header section and a CRAMFS body. The header section includes a super header section S and a directory header section H. The super header S is a fixed 72-byte header that includes information like the image size, the integrity check signatures, configurations, and the root node information to name a few. The directory header H is a variable section which includes the names of the directories, files, symbols, etc. The directory header section H also includes the pointer/location of each file in the data section. Additionally, the directory header H includes information like the hierarchy of the directories and their contents.

The CRAMFS body includes the data section D, which can include compressed and uncompressed sections or portions. The data section includes the data of the files/symbols that are specified in the directory header, but is not so limited.

Figure 10:
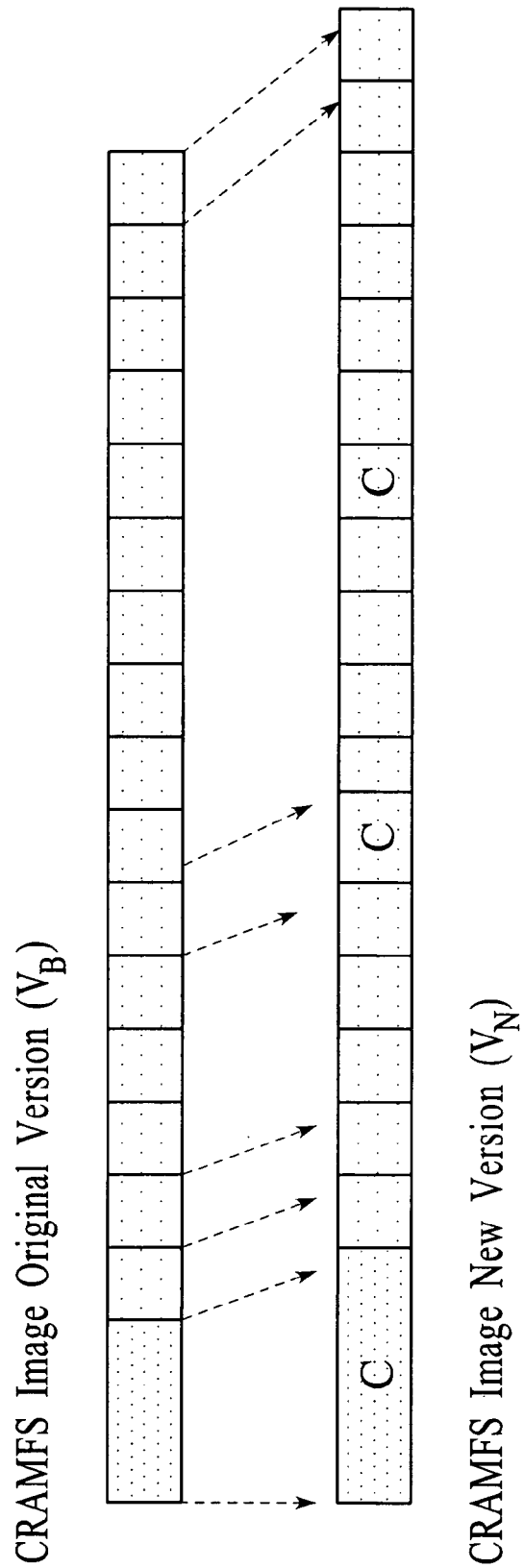
FIG. 10 is an example of an original CRAMFS image (version $V_B$) and a new CRAMFS image (version $V_N$), under an embodiment.

FIG. 10 is an example of an original CRAMFS image (version $V_B$) and a new CRAMFS image (version $V_N$), under an embodiment. In this example the sections of the new image $V_N$ labeled "C" represent sections that include actual changes to the content. The new image $V_N$ shows how the content of all unchanged sections of the image is shifted as a result of the actual changes in the changed sections C.

Figure 11:
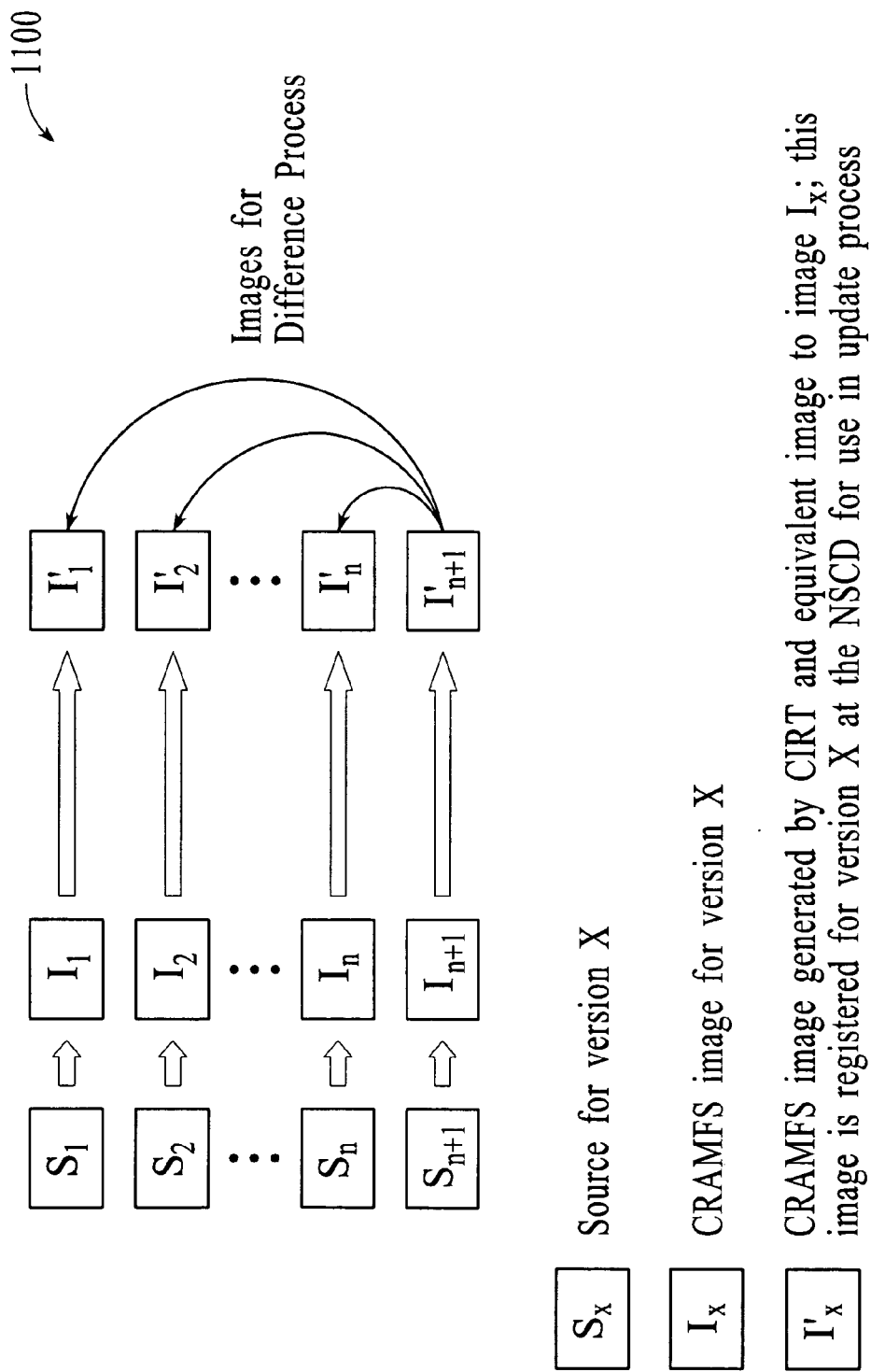
FIG. 11 is the image manipulation of the CIRT, under an embodiment.

Upon validating the new image, components of the CIRT 800 pre-process the new image by initially manipulating or rearranging the image by preparing or generating an image that includes all non-changed file data portions of the input image. FIG. 11 is the image manipulation 1100 of the CIRT, under an embodiment. The CIRT receives a CRAMFS image $I_X$ (where X represents a version number of the image and is a value 1, 2, etc.) for manipulation or reorganization from a source $S_X$ like a software provider. The CIRT generates an equivalent image $I'_X$ from the received image $I_X$. The equivalent image $I'_X$ is registered for version X at the NSCD and used in the update process to generate difference files or delta files as described above.

The CIRT of an embodiment uses the image manipulation 1100 to pre-process the new image $V_N$, also referred to as the current base version, using the original image $V_B$ and in so doing generates an image that is "equivalent" to the original image. This manipulation or rearrangement includes allocating a fixed gap or gap between the CRAMFS header and CRAMFS body (described above with reference to FIG. 9) as per a previous version of the image. The gaps in files that are most likely to change can be pre-filled. The CIRT in generating the equivalent image therefore adds padding to the header section using the gap and repositions changed sections having changed data. The CIRT of an embodiment repositions the changed sections to one or more reserved areas in the image as described below, but is not limited to this repositioning strategy as the repositioning is configurable through one or more options.

Figure 12:
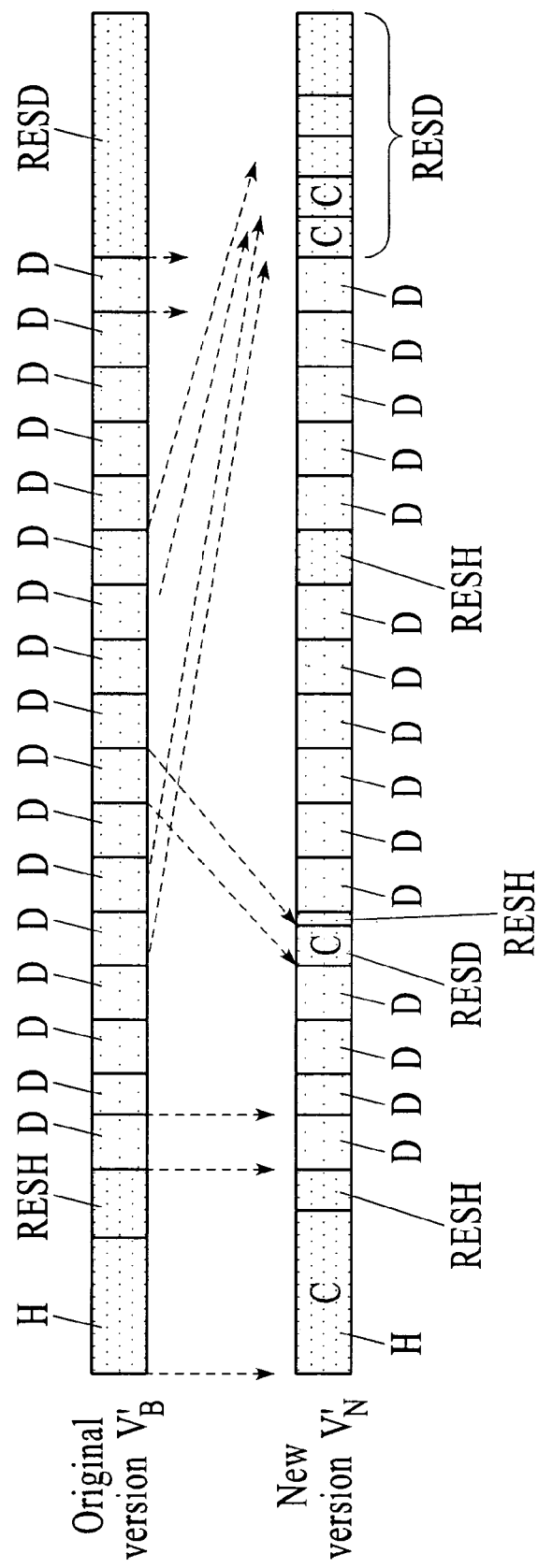
FIG. 12 shows an equivalent image $V'_B$ for the original version of the image $V_B$ and an equivalent image $V'_N$ for the new version of the image $V_N$, under an embodiment.

FIG. 12 shows an equivalent image $V'_B$ for the original version and an equivalent image $V'_N$ for the original version, under an embodiment. The CIRT generates an equivalent image by generating an image with an initial buffer or reserved area RESH in the header section H (if there is no version prior to the current version being processed by the CIRT then the CIRT outputs this image with the initial buffer as the equivalent image). The CIRT logic (repositioning logic) repositions changed sections C of the image to spare reserved space RESD for file body data D at the end of the current image but is not so limited. In this example the sections of the new equivalent image $V'_N$ labeled "C" represent sections that include actual changes to the content.

The repositioning logic uses one or more of a number of different strategies to generate different modified images, and then determines the best image resulting from the different strategies. The different strategies are controlled by the strategy manager using configurable or programmable logic, but are not so limited. The repositioning logic under which the repositioning is performed can include one or more of best-fit algorithms, worst-fit algorithms, and custom logic to name a few. Regardless of the logic used, the CIRT generates an equivalent image under all available repositioning logic or strategies and calculates which of the equivalent images provides the best equivalent image.

The modified images resulting from each of the different strategies are evaluated and the best image is selected. The CIRT of an embodiment selects the best image using the ICF, as described above, but other techniques can be used in alternative embodiments. Components of the CIRT perform validity and integrity checks on the selected modified image and output the modified image and any corresponding information files (e.g., image information file).

In repositioning sections of a received image to generate an equivalent image, the CIRT can handle different sections as appropriate to the type of content in the sections. For example, since the header section is the start of the image and is highly prone to changes, its shift will surely shift all following data sections. Therefore, the CIRT adds a gap in the header section to allow for growth of the header section. The size of this gap is configurable. Similarly, some data sections are more prone to change and can be known in advance (e.g., prelink.cache files, lo.cache files, etc.). The CIRT also provides these files with an extra gap so as to allow for changes in size of these files.

Compressed files or data sections of an embodiment are arranged according to their location in the previous version of the current image so that they occupy the same location in the equivalent image. Regarding eXecute-In-Place (XIP) files or data sections, the CIRT attempts to put all XIP files together in the equivalent image. This is done because the XIP data alignment requirement would result in wasted space as a result of padding bytes in the equivalent image if XIP files were placed between file data sections; putting all XIP files together in the image can eliminate wasted space in the equivalent image because the CIRT only uses padding as necessary to keep the real data and alignment intact in the equivalent image according to the previous version of the current image.

Figure 13:
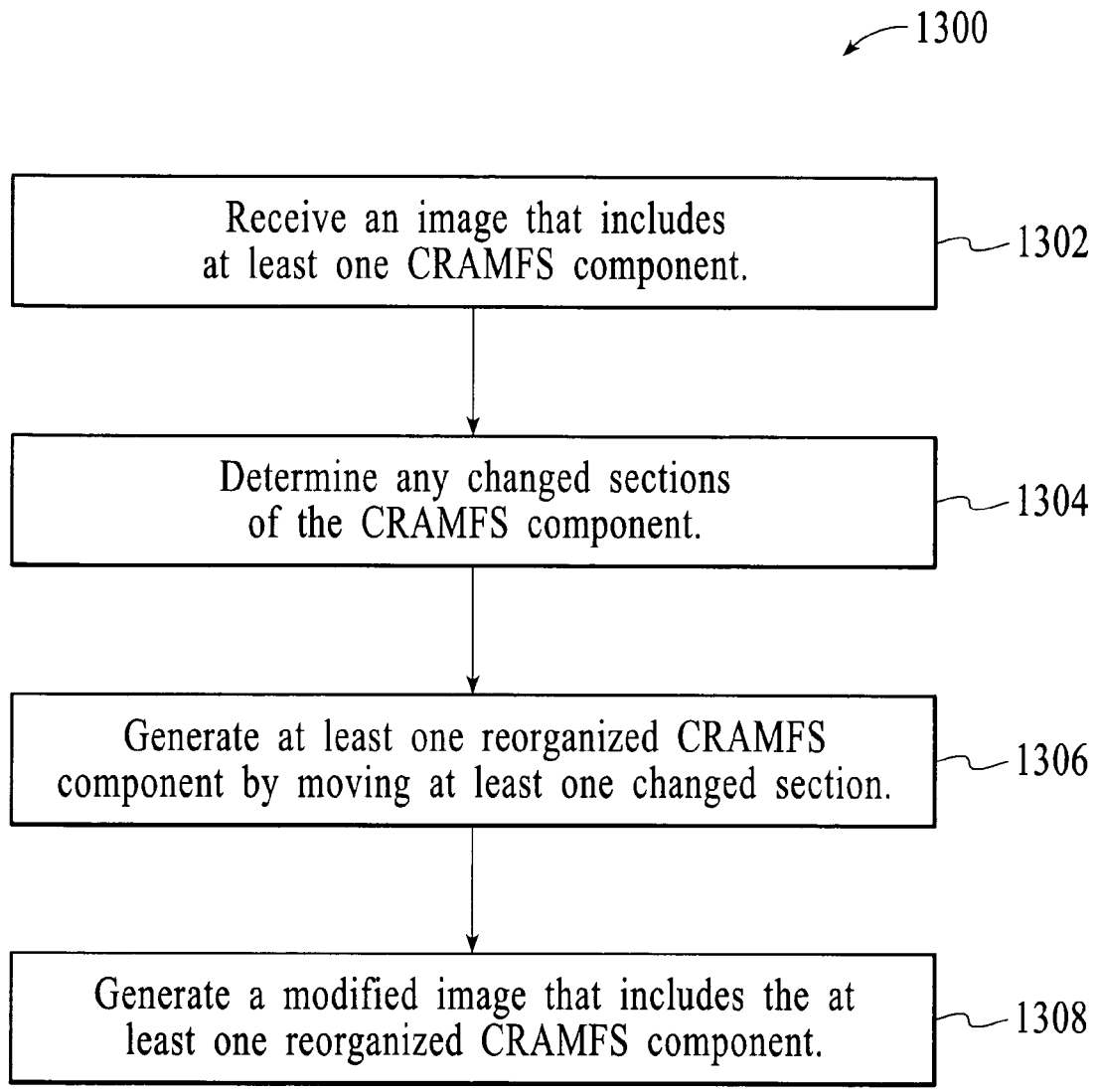
FIG. 13 is a flow diagram for modifying an image, under an embodiment.

FIG. 13 is a flow diagram for modifying 1300 an image, under an embodiment. The modifying 1300 receives 1302 an image that includes one or more CRAMFS components. Any changed data sections of the CRAMFS component(s) are determined or identified 1304. The modifying 1300 further includes generating 1306 one or more reorganized CRAMFS components by reorganizing the received CRAMFS component. Reorganizing of an embodiment includes moving at least one changed section of any changed sections from a first position to a second position in the CRAMFS component. A modified image is generated that includes the reorganized CRAMFS components.

Figure 14:
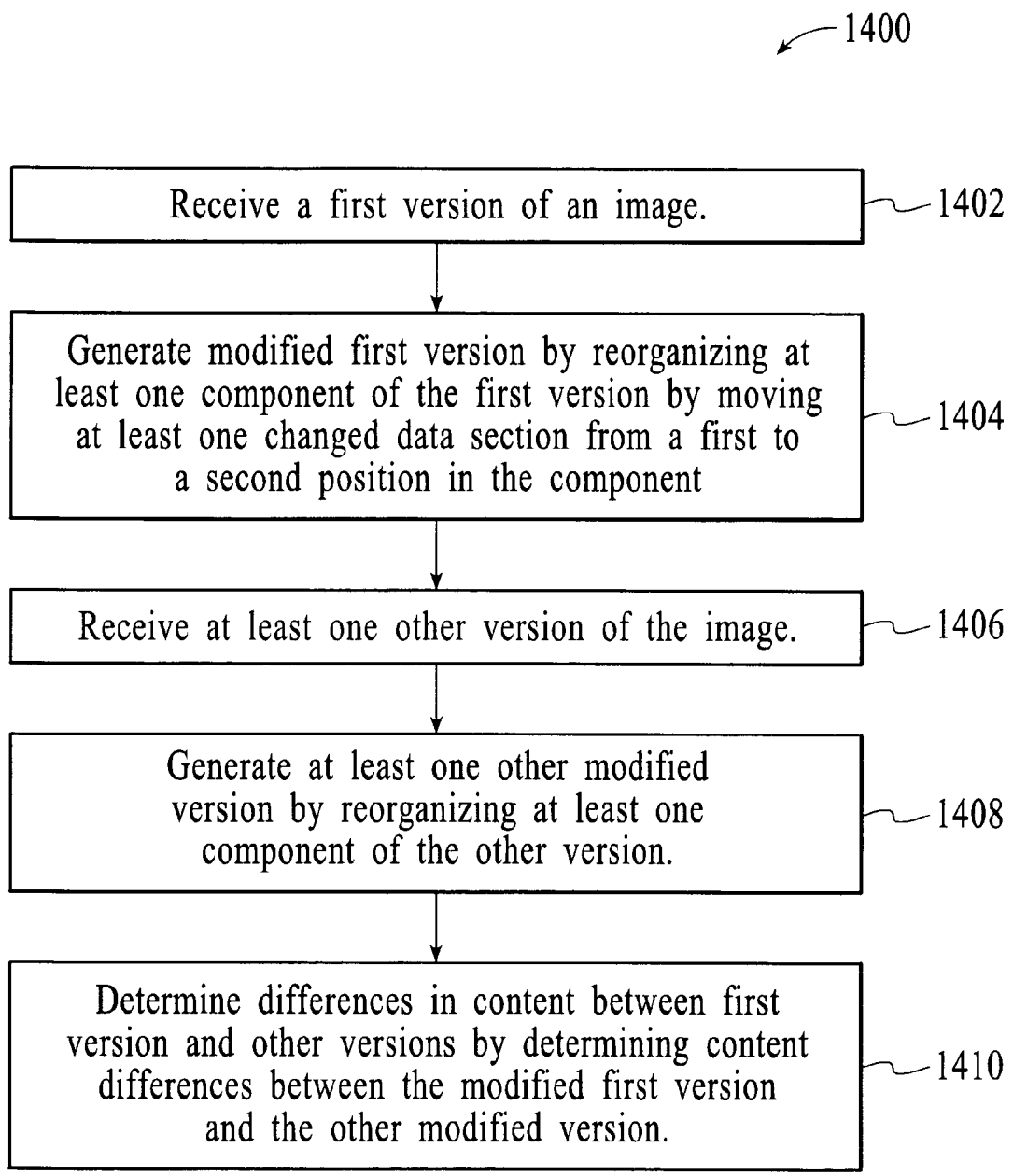
FIG. 14 is a flow diagram for file differencing using equivalent images resulting from the CIRT reorganization, under an embodiment.

FIG. 14 is a flow diagram for file differencing 1400 using modified versions of images, under an embodiment. The differencing 1400 operations receive 1402 a first version of an image. The image includes static file system images but is not necessarily so limited. A modified first version is generated 1404 by reorganizing one or more components of the first version. Reorganizing includes moving at least one changed data section of the component(s) from a first position to a second position in the component. The differencing continues by receiving 1406 at least one other version of the image and generating 1408 at least one other modified version by reorganizing one or more components of each of the other versions. Differences in content are determined 1410 between the first version and at least one of the other versions by determining content differences between the modified first version and the corresponding other modified version.

The IRT of an embodiment can be used as described above in differencing and updating systems. For example, the CIRT can be used as a component of systems and methods for SFS differencing and updating as described in the Related Applications. The systems and methods for SFS differencing and updating include portion-level differencing and block-level updating of update units of an original image (referred to as device blocks or blocks) as described below. The differencing and updating of an embodiment splits SFS images into a series of portions based on block information and the SFS image structure. A delta file is generated for each portion (portion-level differencing) of the new SFS image, and the delta file includes information of differences between the portion of the new SFS image and the portion(s) of the original SFS image to which the new SFS image portion corresponds (a new portion can depend on more than one original portion, and in addition, the original portion(s) might not be in the same location as the new portion). The delta files are transferred to a device for use in updating images of the device to the new SFS image. The target SFS image of the device is updated block-by-block using information of the delta files. The block-by-block update of an embodiment reconstructs all portions of the new SFS image in a device block in random access memory (RAM) of the host device and then writes the reconstructed block into ROM of the host device.

The SFS differencing and updating of embodiments described below receives images of a static file system. The images, which include an original image and a new image, each include a number of blocks, for example super blocks, data blocks, etc. The SFS differencing splits the images by using information of the blocks to split the images into multiple portions. Differences are determined between content of the images by determining differences between the portions of the original image and the new image, where the differences are generated for each portion of the new image. The differences include byte-level differences between the portions, but are not so limited. A delta file is generated that includes the differences for each portion of the new image.

The SFS differencing and updating of embodiments includes updating by which the SFS of an image hosted on a portable device is updated in-place on the portable device. The updating receives the delta file at a portable device via at least one coupling. Dependent ones of the original portions hosted on the portable device are assembled, and at least one of the new portion that is identified that corresponds to the delta file received, where the new portion location in ROM is encoded in the SFS delta package associated with its corresponding delta file in an embodiment. The updating reconstructs at least one new portion on the portable device that corresponds to the delta file identified. The reconstructed new portions of the new image are written to the read-only memory (ROM) of the portable device.

Figure 15:
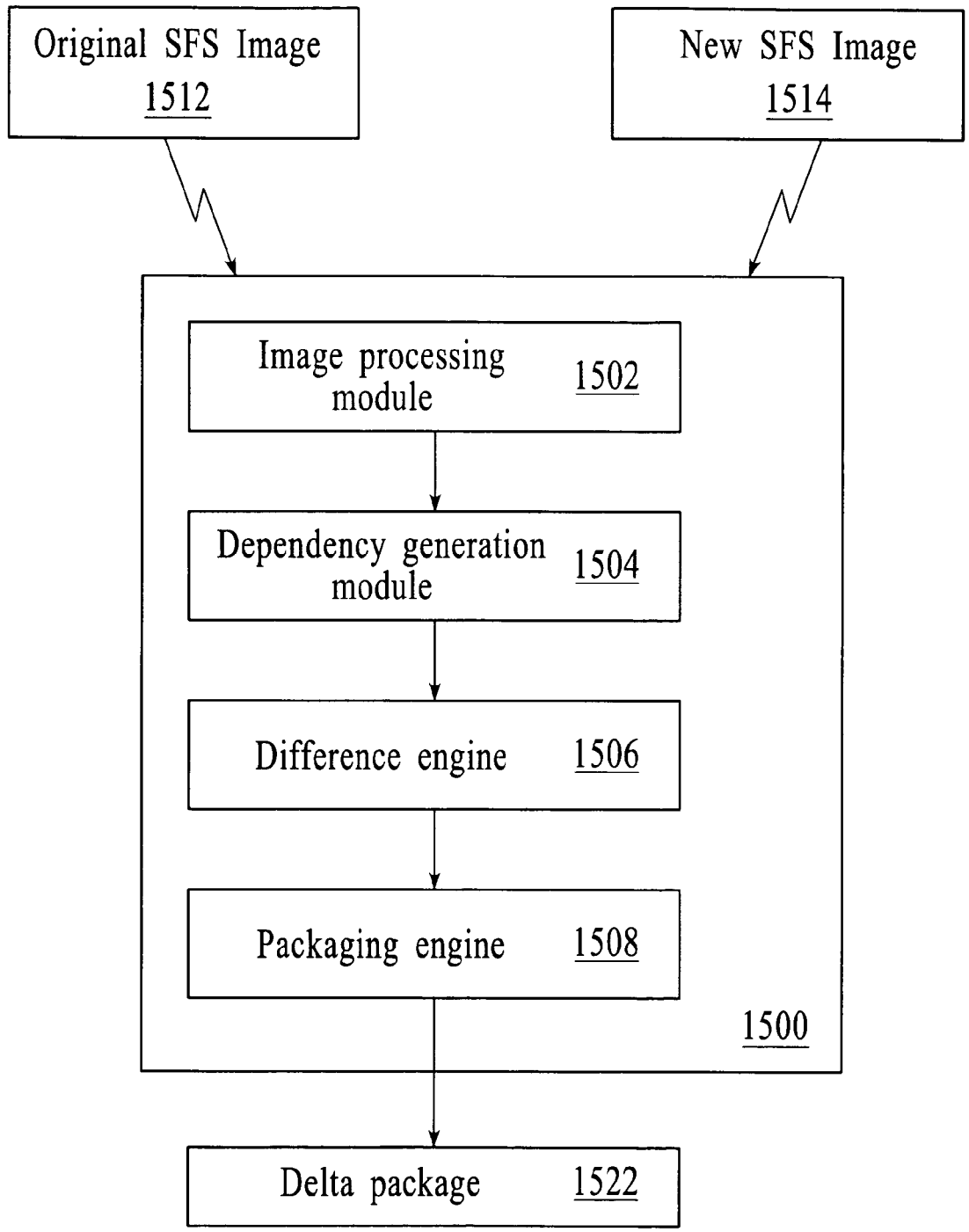
FIG. 15 is a block diagram of an SFS differencing system that can include an IRT, under an embodiment.

FIG. 15 is a block diagram of a SFS differencing system 1500, under an embodiment. The SFS differencing system includes an image processing module 1502, a dependency generation module 1504, a difference engine or module 1506, and a packaging engine or module 1508, but is not so limited. The dependency generation module 1504 of an embodiment is coupled to the image processing module 1502. The difference engine 1506 of an embodiment is coupled to the dependency generation module 1504. The packaging engine 1508 of an embodiment is coupled to the difference engine 1506.

The CIRT can be a component of the image processing module 1502 for example. Also, the CIRT can be coupled to and/or a component of one or more of the image processing module 1502, dependency generation module 1504, difference engine or module 1506, packaging engine or module 1508, and/or various other components of the SFS differencing system 1500.

The SFS differencing system 1500 of an embodiment couples among components of a host computer system (not shown), where the components can include at least one of a processor, a controller, a memory device, and/or a bus, but are not so limited. One or more of the components or modules 1502-1508 of the SFS differencing system 1500 run under control of at least one algorithm, program, or routine. A host computer system processor couples among the components of the host computer system and the components 1502-1508 of the SFS differencing system 1500 under program control. While the image processing module 1502, dependency generation module 1504, difference engine 1506, and packaging engine 1508 are shown as separate blocks, some or all of these blocks 1502-1508 can be monolithically integrated onto a single chip, distributed among a number of chips or components of a host system, and/or provided by one or some combination of programs or algorithms. The programs or algorithms when present can be implemented in software algorithm(s), firmware, hardware, and any combination of software, firmware, and hardware.

In operation the SFS differencing system 1500 receives at least one original SFS image 1512 and at least one new SFS image 1514 and performs portion-level differencing to generate one or more delta files as described below. The delta files are assembled into a delta package 1522 for transfer to a portable or mobile device, also referred to as a client device. These differences include byte-level differences between one or more portions of blocks of the compared images, but are not so limited. The SFS differencing system 1500 generates the delta file in a processor-based or computer system or running under a processor-based or computer system. The computer system on which or under which the SFS differencing system runs includes any collection of computing components and devices operating together, as is known in the art. The computer system can also be a component or subsystem within a larger computer system or network.

Contents of the delta file provide an efficient representation of the differences between the original image 1512 and the new image 1514. The delta file can include meta-data along with actual data of replacement and/or insertion operations that represent the differences between the new or current version of the associated file and previous versions of the file, as described in the U.S. Pat. No. 6,925,467 issued to InnoPath Software, Inc. of Sunnyvale, Calif. on Aug. 2, 2005. The SFS differencing system 1500 provides any differences between the original image 1512 and the new image 1514 in delta files of the delta package 1522 using a minimum number of bytes and a pre-defined format or protocol, thereby providing a delta file optimized in space.

Figure 16:
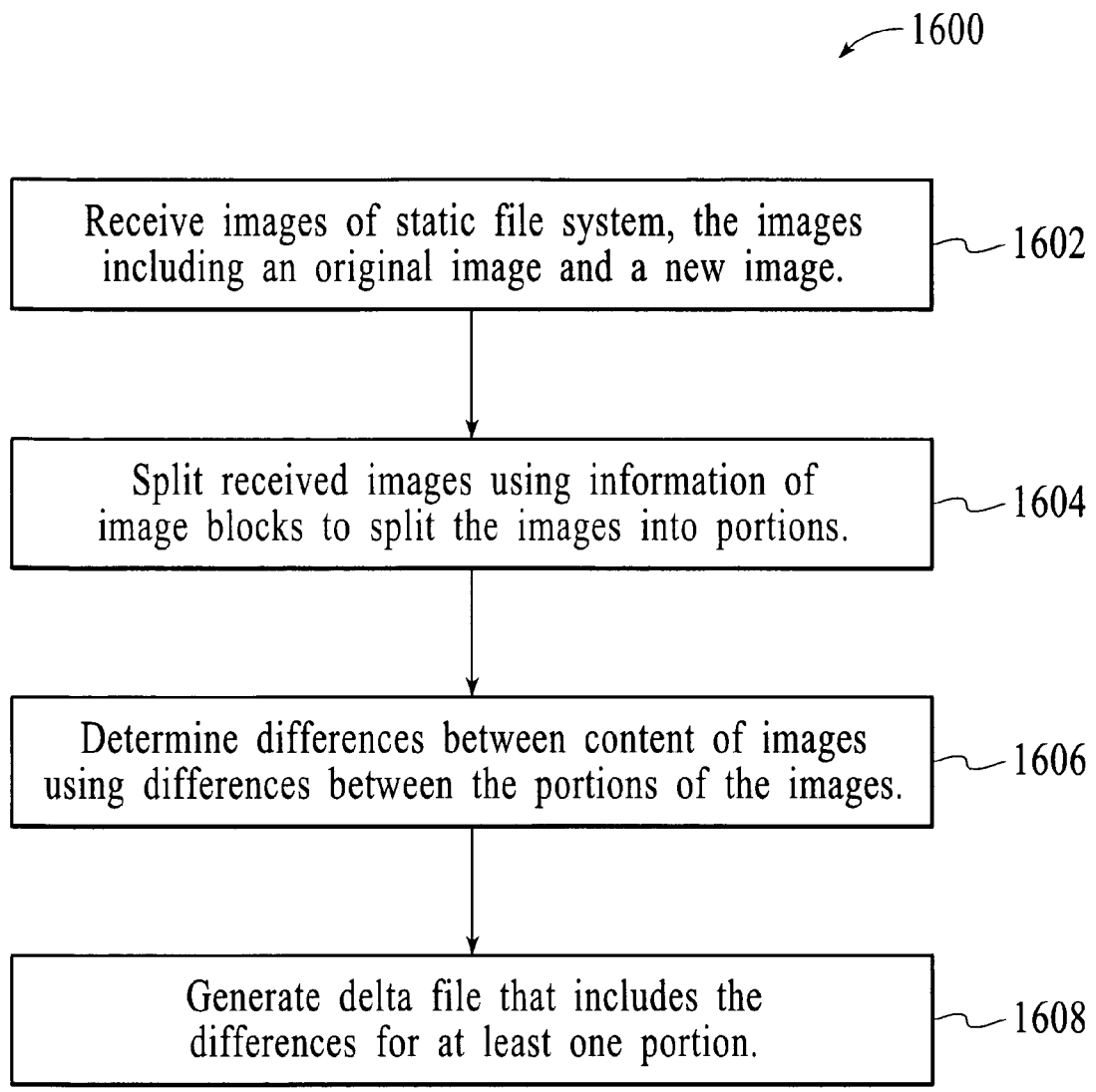
FIG. 16 is a flow diagram for SFS differencing, under an embodiment.

The SFS differencing system 1500 performs portion-level differencing, and FIG. 16 is a flow diagram for SFS differencing 1600, under an embodiment. The SFS differencing is performed, for example, using the SFS differencing system 1500 described above and elsewhere herein. The SFS differencing 1600 receives 1602 images of a static file system. The images include an original image and a new image, but are not so limited. Each image also includes a number of blocks, for example super blocks, data blocks, etc. The blocks are of a pre-specified size (e.g., 64 KB, 128 KB, etc.) but are not so limited. The blocks of the received images are split 204 into a number of portions using information of the blocks for example. The SFS differencing 1600 determines 1606 differences between content of the images by determining differences between the portions of each of the original image and the new image. A delta file is generated 1608 that includes information of the differences in content or data between each portion of the new image and one or more aligned portions of the original image.

Figure 17:
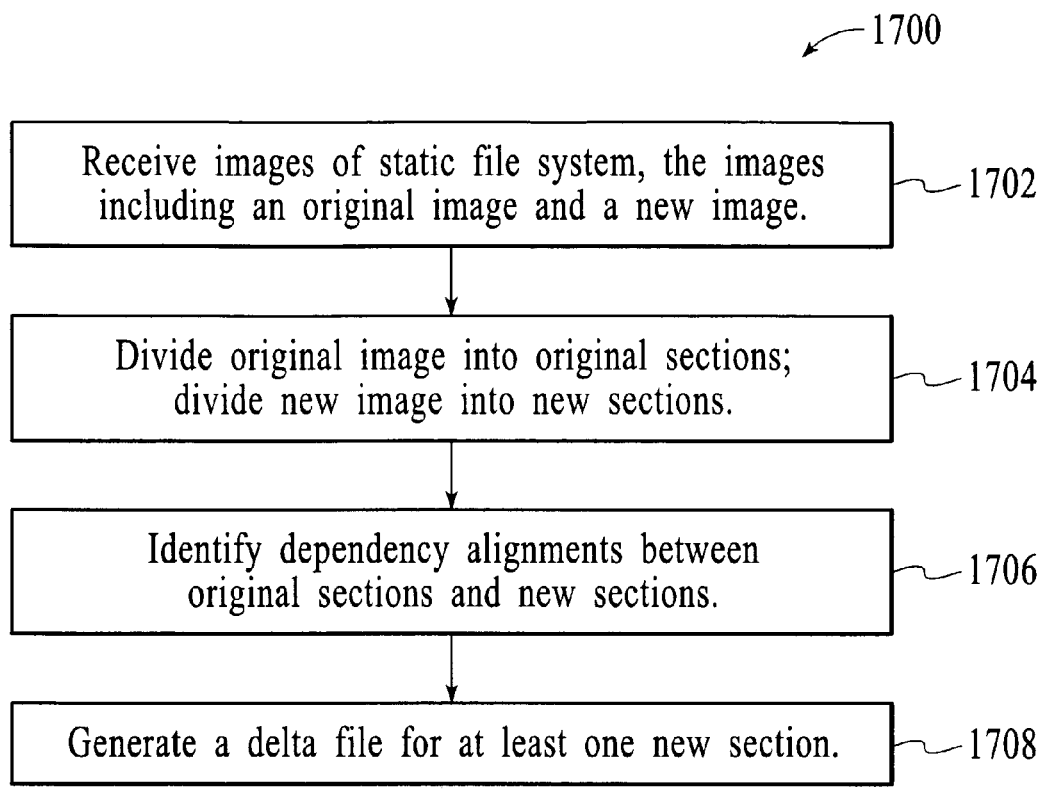
FIG. 17 is a flow diagram for SFS differencing, under another embodiment.

As another example, FIG. 17 is a flow diagram for SFS differencing 1700, under an embodiment. The SFS differencing 1700 receives 1702 images of a static file system, as described above with reference to FIG. 15. The received original image is divided 1704 into one or more original sections or portions, and the received new image is divided 1704 into one or more new sections or portions. The SFS differencing identifies 1706 dependency alignments between the original sections and the new sections. A delta file is generated 1708 for at least one of the new sections. The delta file includes but is not limited to differences between a new section and one or more original section(s), where the new section depends on the original section(s). The delta files of alternative embodiments may include differences between at least one new section and at least one original section on which the new sections depend.

The image processing module 1502, as described above with reference to FIG. 15, receives each of an original SFS image 1512 and a new SFS image 1514. The image processing module 1502 of an embodiment operates to begin the portion-level differencing of the received images by parsing the specific image area and extracting information of the images. The information extracted about the images is used in differencing and updating operations. This parsing includes decoding the information of the static file system structure and internal format to get related information for use in performing SFS image differencing and updating. The information resulting from the parsing includes, but is not limited to, the locations and sizes of blocks of the image (e.g., super blocks, data blocks, etc.), the compression library used (if compressed), the type of encryption used to encrypt the image (e.g., encryption algorithm, encryption key, etc.) (if encrypted), to name a few.

Figure 18:
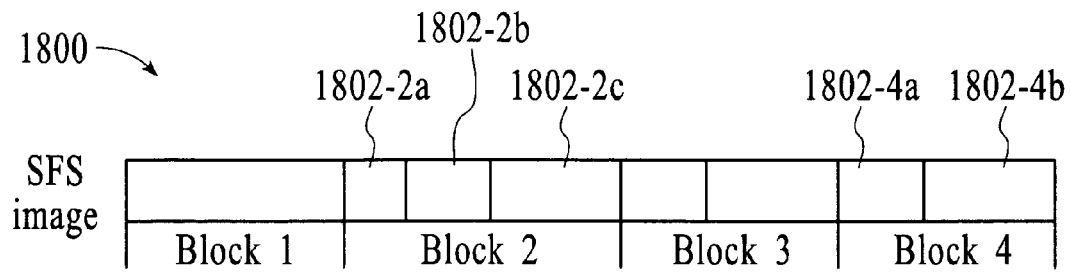
FIG. 18 is an example SFS image following splitting of the image blocks into portions, under an embodiment.

Based on the target device block information, the image processing module 1502 divides or splits the SFS image into a number or series of portions. FIG. 18 is an example SFS image 1800 following splitting into portions 1802 by the image processing module 102, under an embodiment. The portions 1802 include portions or parts of a block (e.g., "Block 4") of the image but are not so limited. For example, following splitting of an embodiment Block 2 includes portions 1802-2a, 1802-2b, and 1802-2c, and Block 4 includes portions 1802-4a and 1802-4b. Following the splitting operation a block may contain any number of portions as appropriate to the data content of the block and/or the specific structure of the SFS image. The portions include for example a super block/header portion, a control meta-data portion, a file portion, etc. The SFS image processing module 1502 may perform decompression (when the image is compressed), decryption (when the image is encrypted) and/or any other processing needed in order for the image processing module 1502 to extract data from the received image.

The image processing module 1502 of an embodiment also outputs a file which includes mapping information like the SFS image/file name and one or more locations of the SFS image/file name, for example. This file is referred to herein as a hint file but is not so limited.

The dependency generation module 1504, also referred to herein as a dependency analysis module or dependency generator, determines or generates a mapping or alignment between the original images and the new images. The alignment includes information as to portions of the new image that depend on portions of the original image. The alignment of an embodiment also can include information as to the sequence by which the portions of the new image are to be updated during the in-place update of the original image hosted in the processor-based portable device. The dependency generation module 104 uses information of the specific structure of the SFS as domain knowledge (e.g., information from the hint file) in performing the alignment, and the alignment is determined relative to the block boundaries of the images, but is not so limited.

The difference engine 1506 generally determines or computes the portion-level differences between data of each new portion of the new image and data of the original portion of the original image. The difference engine 1506 uses information received from the dependency generation module 1504 to read or gather one or more portions of the original image on which each portion of the new image depends. The difference engine 1506 of an embodiment computes the differences between content of the new portion and content of the original portion upon which the new portion depends. The identified differences in data between the original and new portions are encoded into a file that is referred to herein as a delta file. In addition to the encoded differences in data between original and new portions, the delta file can include control information like dependency information of dependencies between new portions and original portions. Furthermore, the delta file can include verification information (e.g., checksum values, cyclic redundancy codes (CRCs), etc.) of the delta body, the original portion of an image to be updated, and the corresponding dependency information While the difference engine 1506 described above determines differences between original and new images at the portion-level, the difference engine of alternative embodiments may determine differences using a different granularity (e.g., multiple portions, etc.). Furthermore, while the difference engine 1506 described above generates a delta file for each portion of a new image that is different from the portion of the original image on which it depends, alternative embodiments may generate more than one delta file for each portion or may include difference information of multiple portions in one delta file.

The packaging engine 1508 receives the delta files generated by the difference engine 1506 and assembles the delta files into a delta package or difference package. The packaging engine 1508 of an embodiment assembles the delta files into the delta package according to an update order or sequence, but is not so limited. The packaging engine 1508 can also perform additional operations on the delta file and/or delta package, for example encrypting the delta package.

While the SFS differencing system 1500 described above is described as including the image processing module 1502, dependency generation module 1504, difference engine 1506, and packaging engine 1508 as separate modules or components, the embodiment is not so limited. Alternative embodiments for example can include functionality of the modules 1502-1508 in one or more modules and/or distribute the functionality of modules 1502-1508 among any number of modules or system components.

The SFS differencing and updating of embodiments include updating by which SFS images hosted on a device like a portable electronic device are updated in-place on the device, as described above. The updating receives the delta file at a portable device via at least one coupling. Dependent ones of the original portions hosted on the portable device are assembled, and at least one of the dependent original sections is identified that corresponds to the delta file received. The updating reconstructs at least one new portion on the portable device that corresponds to the delta file identified. The reconstructed new portions of the new image are written to the ROM of the portable device.

Figure 19:
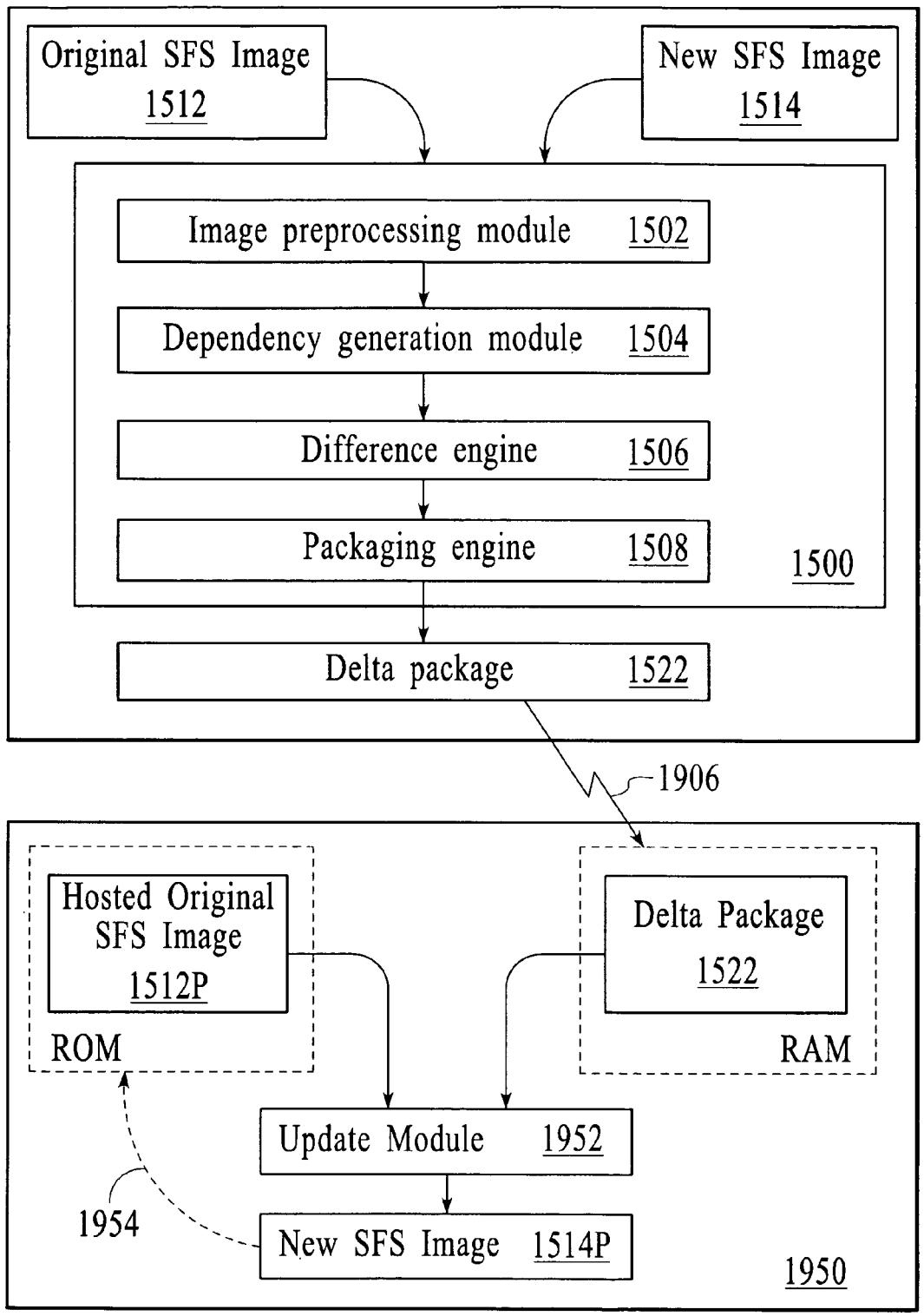
FIG. 19 is a block diagram of an SFS differencing and updating system, under an embodiment.

FIG. 19 is a block diagram of an SFS differencing and updating system 1900, under an embodiment. The system 1900 includes an SFS differencing system 1500 and an SFS updating system 1950. The SFS differencing system 1500 includes an image processing module 1502, a dependency generation module 1504, a difference engine 1506, and a packaging engine 1508, as described above with reference to FIG. 15, but is not so limited. In operation the SFS differencing system 1500 receives at least one original SFS image 1512 and at least one new SFS image 1514 and performs portion-level differencing to generate a delta package 1522 that includes one or more delta files as described herein.

The SFS differencing system 1500 generates the delta file in a processor-based or computer system or running under a processor-based or computer system. The computer system on which or under which the SFS differencing system 1500 runs includes any collection of computing components and devices operating together, as is known in the art. The computer system can also be a component or subsystem within a larger computer system or network.

The SFS updating system 1950 is hosted on a processor-based device, and receives the delta file and performs updates to original images hosed on the portable device. The processor-based device or system on which or under which the SFS updating system 1950 runs includes any collection of computing components and devices operating together, as is known in the art. The computer system can also be a component or subsystem within a larger computer system or network. The processor-based device or system can include mobile devices, for example, cellular telephones, personal computers, portable computing devices, portable telephones, portable communication devices, subscriber devices or units, and personal digital assistants (PDAs). The mobile devices, also referred to as "mobile communication devices," "portable communication devices" and "communication devices," can include all such devices and equivalents, and are not limited to communication devices that are wireless.

The SFS differencing system 1500 and SFS updating system 1950 communicate via a communication path 1906. The communication path 1906 includes any medium by which files are communicated or transferred between processor-based devices or systems. Therefore, the communication path 1906 includes wireless couplings or connections, wired couplings or connections, and hybrid wireless/wired couplings or connections. The communication path 1906 also includes couplings or connections to and/or through networks or network components including local area networks (LANs), metropolitan area networks (MANs), wide area networks (WANs), proprietary networks, interoffice or backend networks, and the Internet. The communication path 1906 can include various network components (not shown) of a communication service provider or carrier, but is not so limited. Furthermore, the communication path 1906 includes removable fixed mediums like floppy disks, hard disk drives, and CD-ROM disks, as well as telephone lines, buses, and electronic mail messages.

The delta package 1522 is transferred or transmitted to the SFS updating system 1950 via the communication path 1906. The SFS updating system 1950 includes an update module 1952 that uses information of the delta package 1522 to perform an in-place update 1954 of the SFS image 1512P hosted on the portable device. The update module 1952 generally reconstructs the new image 1514P at the portable device by applying contents of the delta package 1522 to portions of the original SFS image 1512P hosted on the portable device. The reconstructed portions of the new image 1514P are written to the ROM of the portable device, for example, by writing the new image 1514P over the hosted original image 1512P. Upon completion of this SFS update process, the SFS image now hosted on the portable device is substantially identical to the new SFS image 1514 received in the first SFS differencing system 1500.

Figure 20:
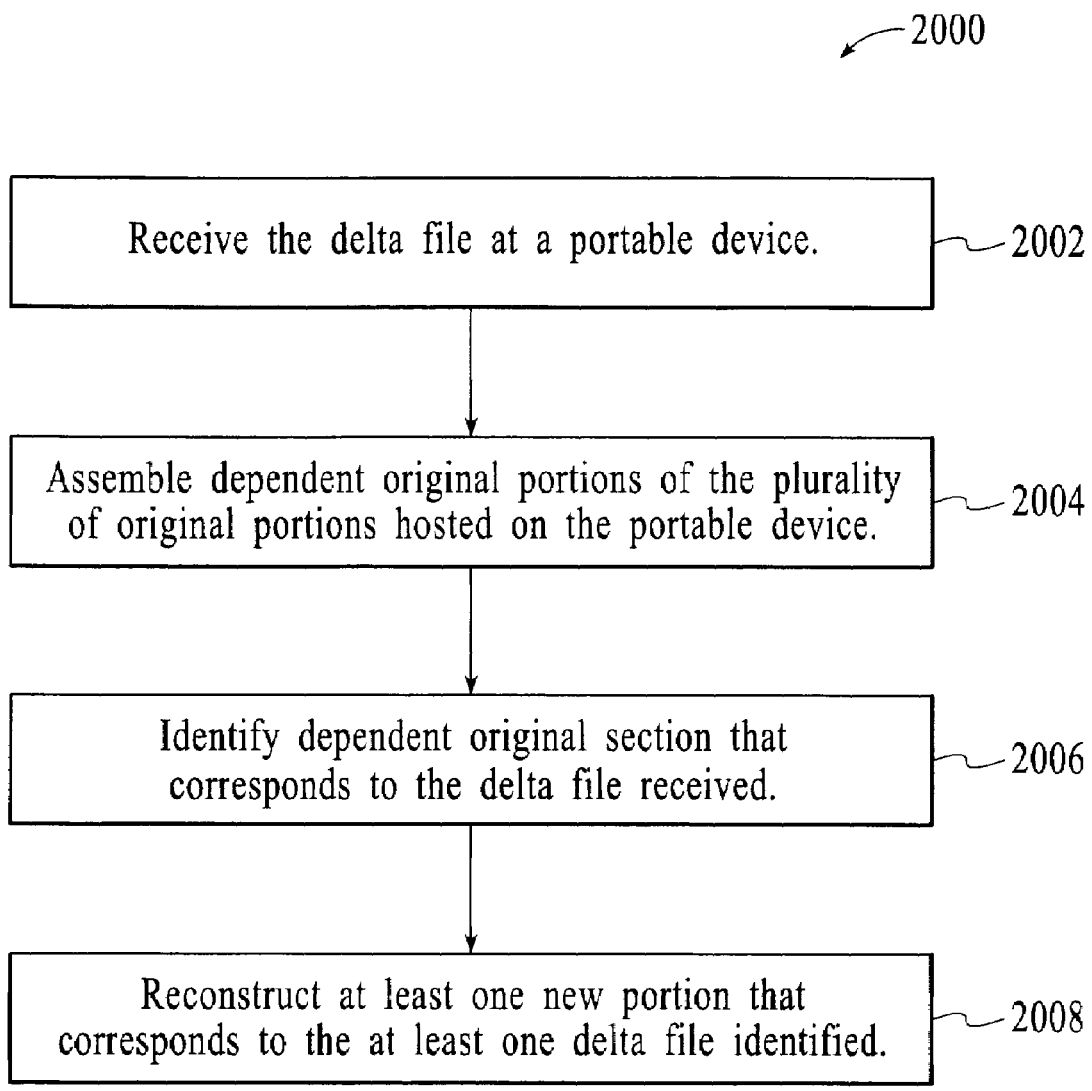
FIG. 20 is a flow diagram for SFS updating, under an embodiment.

FIG. 20 is a flow diagram for SFS updating 2000, under an embodiment. The SFS updating 2000 of an embodiment is used in resource-limited computing devices for example. The SFS updating receives 2002 the delta file at a portable device via at least one coupling. Dependent original portions of the SFS image hosted on the portable device are assembled 2004. The updating 2000 identifies 2006 at least one of the dependent original sections that correspond to the received delta file. The updating 2000 reconstructs 2008 at least one new portion on the portable device that corresponds to the delta file identified. The reconstructed new portions of the new image are subsequently written to the memory (e.g., ROM) of the portable device, for example, simultaneous with or subsequent to processing of all delta files received in a delta package.

Figure 21:
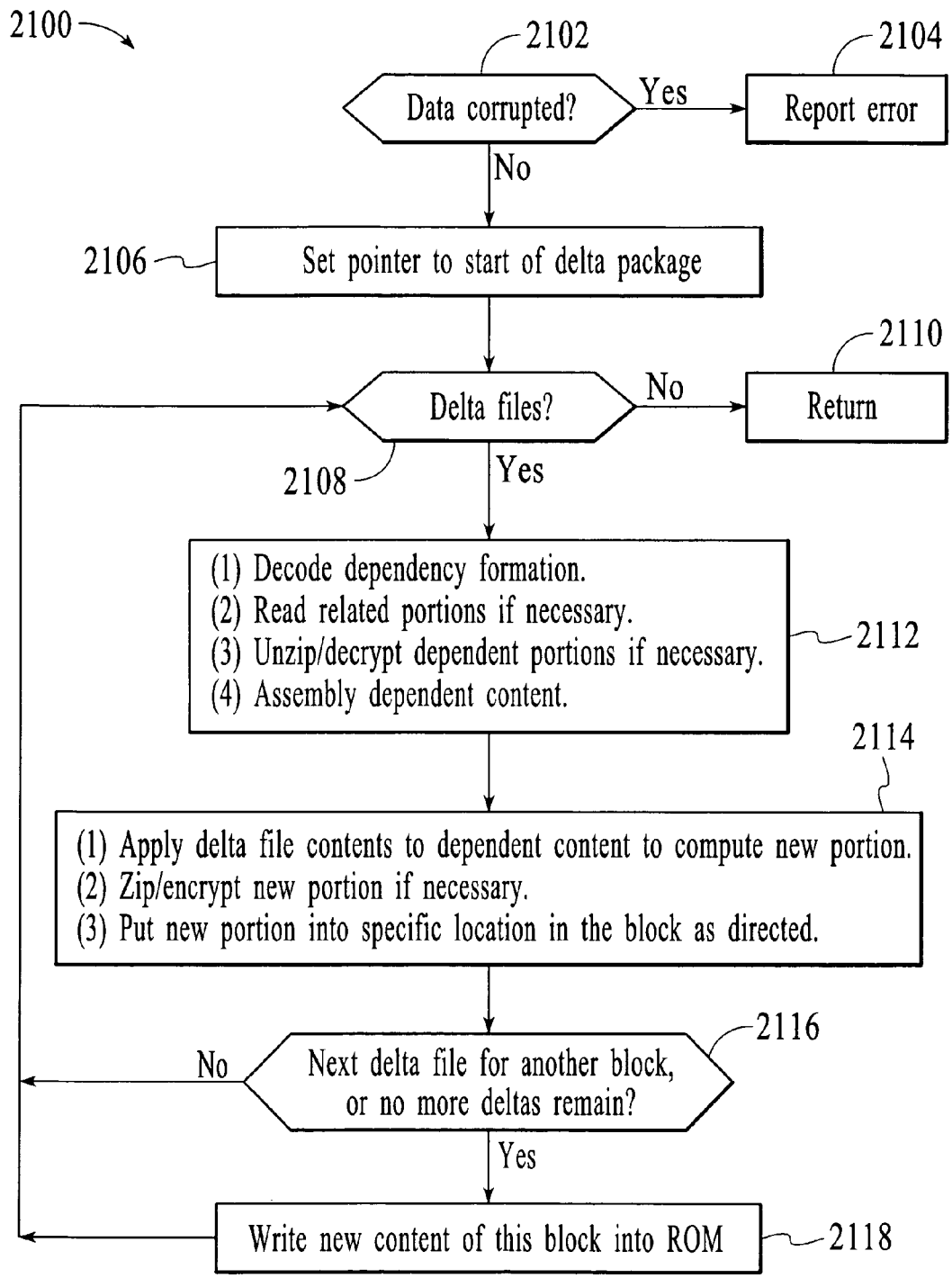
FIG. 21 is a flow diagram for in-place updating of SFS images in devices, under an embodiment.

FIG. 21 is a flow diagram for in-place updating 2100 of SFS images in devices, under an embodiment. The updating 2100 can be performed for example by an update module 1952 as described above with reference to FIG. 19. The updating 2100 uses the control information encoded in the received delta package to determine 2102 that data of the delta package is not corrupt, thereby verifying the integrity of the delta package contents. The integrity of each SFS image portion to be updated can also be verified. If any data of the delta package is corrupt, the error is reported 2104.

When it is determined 2102 that the data of the delta package is not corrupt, the updating 2100 sets 2106 a pointer to the start of the delta package in order to begin the update. The portion update order and device block update order is implicitly encoded in the delta package of an embodiment. It is determined 2108 that a delta file is present at the start of the update and the update proceeds. The delta file could be encrypted for security purposes and, in that case, the delta file is decrypted (using appropriate keys) before or simultaneous with the start of the update process. The updating 2100 uses information of the delta file contents (e.g., control information) to decode 2112 dependency formation information, read 2112 related portions of the original image (if necessary), unzip and/or decrypt 2112 dependent portions of the original image (if necessary), and assemble 2112 dependent content of original portions of the original image hosted on the portable device.

The updating 2100 generates or reconstructs the new portion of the image being updated by applying 2114 the contents of the delta file to the dependent content of the original portion of the original image. The new portion once reconstructed is written to an area of RAM in the host device, and is zipped and/or encrypted 2114 as appropriate to the SFS image. The new portion is placed 2114 into a specific location in the block of the original image so as to replace the original portion to which it corresponds. After each block of the new image is created or reconstructed, that particular block is written to the ROM; alternative embodiments may write the reconstructed blocks to the ROM at other points in the update process. The update process then proceeds with processing the delta file for the next block.

The updating 2112 and 2114 described above continues until the end of the delta package is reached and all delta files of the delta package have been processed. In so doing, a determination 2116 is made as to whether the delta package includes further delta files for use in updating additional portions of the original image. When the delta package includes unprocessed delta files corresponding to additional portions of the original image to be updated, operation returns to read and apply these unprocessed delta files. When it is determined 2116 that all delta files of the delta package have been processed and applied to the original image, the updating 2100 writes 2118 the new SFS image to the ROM of the portable device. The updating of an embodiment overwrites the original SFS image with the new SFS image, but alternative embodiments can write the new SFS image to one or more other areas of ROM or other device memory areas.

Referring to FIGS. 1-3, 6-8, 11-17, and 19-21, the operations of the processes are under control of at least one processor, but are not so limited. Those skilled in the relevant art can create source code, microcode, program logic arrays or otherwise implement the IRT, SFS differencing, and/or SFS updating of an embodiment based on these flow diagrams and the detailed description provided herein. The algorithm or routine operating according to these flow diagrams is stored as program code in machine-readable or computer-readable memory areas or devices of a computer system (e.g., non-volatile memory) that forms part of the associated processors, in the associated memory areas, in removable media, such as disks, or hardwired or preprogrammed in chips, such as electronically erasable programmable ROM ("EEPROM") semiconductor chips, or in any combination of these components, but is not so limited.

The IRT of an embodiment includes a method comprising receiving an image that includes at least one component, wherein the at least one component includes a compressed read-only memory file system (CRAMFS) format. The method of an embodiment comprises determining any changed sections of the at least one component. The method of an embodiment comprises generating at least one reorganized component by reorganizing the at least one component, the reorganizing including moving at least one changed section of any changed sections from a first position to a second position in the component. The method of an embodiment comprises generating a modified image that includes the at least one reorganized component.

The image of an embodiment is a static file system image.

The method of an embodiment comprises receiving at least one parameter of the at least one CRAMFS component, wherein the at least one parameter includes at least one of a starting address of a CRAMFS component, a size of the CRAMFS component, and a data offset of the CRAMFS component.

The method of an embodiment comprises determining a data offset of the at least one CRAMFS component, the data offset specifying an amount of memory to be allocated in the reorganized CRAMFS component for a header of the at least one CRAMFS component.

The method of an embodiment comprises receiving at least one resize list, wherein information of the resize list specifies at least one file that is to be increased in size in the reorganized CRAMFS component, wherein the at least one file is within at least one component of the reorganized CRAMFS component.

The second position of an embodiment follows any unchanged data section of the at least one CRAMFS component.

The method of an embodiment comprises generating an image information file that includes information of the modified image.

The method of an embodiment comprises converting the image to a binary file simultaneous with or subsequent to receiving the image.

The byte-level differences between the CRAMFS component and the reorganized CRAMFS component of an embodiment are at a minimum and the reorganized CRAMFS component is functionally equivalent to a corresponding one of the at least one CRAMFS component.

The method of an embodiment comprises determining differences in content between a first version of a file and a second version of a file, wherein the first version and the second version each include corresponding versions of the image, wherein determining differences includes determining data differences between the modified image of the first version and the modified image of the second version.

The at least one CRAMFS component of an embodiment includes a single CRAMFS component. The method of an embodiment comprises receiving a first version of the image. The method of an embodiment comprises determining any changed sections of the CRAMFS component of the first version and generating a first reorganized CRAMFS component by moving the changed sections. The method of an embodiment comprises generating a modified first version that includes the first reorganized CRAMFS component.

The method of an embodiment comprises receiving a second version of the image. The method of an embodiment comprises determining any changed sections of the CRAMFS component of the second version and generating a second reorganized CRAMFS component by moving the changed sections. The method of an embodiment comprises generating a modified second version that includes the second reorganized CRAMFS component.

The method of an embodiment comprises receiving a first image information file of the first image.

The method of an embodiment comprises determining differences in content between the first version and the second version by determining data differences between the modified first version and the modified second version. The method of an embodiment comprises generating a difference file that includes the differences identified between the first version and the second version.

The method of an embodiment comprises receiving a third version of the image. The method of an embodiment comprises determining any changed sections of the CRAMFS component of the third version and generating a third reorganized CRAMFS component by moving the changed sections. The method of an embodiment comprises generating a modified third version that includes the third reorganized CRAMFS component.

The method of an embodiment comprises receiving a second image information file of the second image.

The method of an embodiment comprises determining differences in content between the second version and the third version by determining data differences between the modified second version and the modified third version.

The at least one CRAMFS component of an embodiment includes a plurality of CRAMFS components. The method of an embodiment comprises receiving a first version of the image. The method of an embodiment comprises determining any changed sections of a first CRAMFS component of the first version and generating a first reorganized CRAMFS component by moving the changed sections. The method of an embodiment comprises determining any changed sections of a second CRAMFS component of the first version and generating a second reorganized CRAMFS component by moving the changed sections. The method of an embodiment comprises generating a modified first version that includes the first reorganized CRAMFS component and the second reorganized CRAMFS component.

The method of an embodiment comprises determining any changed sections of at least one additional CRAMFS component of the first version, wherein the at least one additional CRAMFS component is in addition to the first CRAMFS component and the second CRAMFS component. The method of an embodiment comprises generating at least one additional reorganized CRAMFS component by moving the changed sections of the at least one additional CRAMFS component, wherein the generating a modified first version includes generating the modified first version to include the first reorganized CRAMFS component, the second reorganized CRAMFS component, and the at least one additional reorganized CRAMFS component.

The method of an embodiment comprises receiving a second version of the image. The method of an embodiment comprises determining any changed sections of a first CRAMFS component of the second version and generating a third reorganized CRAMFS component by moving the changed sections. The method of an embodiment comprises determining any changed sections of a second CRAMFS component of the second version and generating a fourth reorganized CRAMFS component by moving the changed sections. The method of an embodiment comprises generating a modified second version that includes the third reorganized CRAMFS component and the fourth reorganized CRAMFS component. The method of an embodiment comprises determining differences in content between the first version and the second version by determining data differences between the modified first version and the modified second version.

The IRT of an embodiment includes a method comprising receiving a first version of an image that is a static file system image. The method of an embodiment comprises generating a modified first version by reorganizing at least one component of the first version, wherein reorganizing includes moving at least one changed data section of the at least one component from a first position to a second position in the component. The method of an embodiment comprises receiving at least one other version of the image. The method of an embodiment comprises generating at least one other modified version by reorganizing at least one component of each of the at least one other version. The method of an embodiment comprises determining differences in content between the first version and the at least one other version by determining content differences between the modified first version and the at least one other modified version.

The method of an embodiment comprises generating a difference file that includes the differences identified between the first version and the at least one other modified version.

The reorganizing of an embodiment comprises identifying at least one changed data section of each version of the image, wherein the at least one changed data section includes a data section having changed content in at least one file of the component. The reorganizing of an embodiment comprises repositioning the at least one changed data section to at least one position that follows all unchanged data sections of the component.

The at least one component of an embodiment includes a compressed read-only memory file system (CRAMFS) format component.

The IRT of an embodiment includes a device for differencing static file system images. The device of an embodiment comprises a receiver that receives images of a static file system, the images including at least one compressed read-only memory file system (CRAMFS) format component. The device of an embodiment comprises a pre-processor coupled to the receiver, the pre-processor configured to determine any changed sections of the at least one CRAMFS component, the pre-processor further configured to generate at least one reorganized CRAMFS component by reorganizing the at least one CRAMFS component, the reorganizing including moving at least one changed section of any changed sections from a first position to a second position in the CRAMFS component, the pre-processor further configured to generate a modified image that includes the at least one reorganized CRAMFS component.

The pre-processor of an embodiment is configured to receive at least one parameter of the at least one CRAMFS component, wherein the at least one parameter includes at least one of a starting address of a CRAMFS component, a size of the CRAMFS component, and a data offset of the CRAMFS component.

The pre-processor of an embodiment is configured to determine a data offset of the at least one CRAMFS component, the data offset specifying an amount of memory to be allocated in the reorganized CRAMFS component for a header of the at least one CRAMFS component.

The pre-processor of an embodiment is configured to receive at least one resize list, wherein information of the resize list specifies at least one file that is to be increased in size in the reorganized CRAMFS component, wherein the at least one file is within at least one component of the reorganized CRAMFS component.

The second position of an embodiment follows any unchanged data section of the at least one CRAMFS component.

The pre-processor of an embodiment is configured to generate an image information file that includes information of the modified image.

The byte-level differences between the CRAMFS component and the reorganized CRAMFS component of an embodiment are at a minimum and the reorganized CRAMFS component is functionally equivalent to a corresponding one of the at least one CRAMFS component.

The pre-processor of an embodiment is configured to determine differences in content between a first version of a file and a second version of a file, wherein the first version and the second version each include corresponding versions of the image, wherein determining differences includes determining data differences between the modified image of the first version and the modified image of the second version.

The IRT of an embodiment includes a system comprising a receiver that receives a first version of an image and at least one other version of the image, wherein the image is a static file system image. The system of an embodiment includes a pre-processor coupled to the receiver, the pre-processor configured to generate a modified first version by reorganizing at least one component of the first version, wherein reorganizing includes moving at least one changed data section of the at least one component from a first position to a second position in the component, the pre-processor further configured to generate at least one other modified version by reorganizing at least one component of each of the at least one other version. The system of an embodiment includes a difference engine coupled to the pre-processor, the difference engine configured to determine differences in content between the first version and the at least one other version by determining content differences between the modified first version and the at least one other modified version.

The pre-processor of an embodiment is configured to receive at least one parameter of the at least one CRAMFS component, wherein the at least one parameter includes at least one of a starting address of a CRAMFS component, a size of the CRAMFS component, and a data offset of the CRAMFS component.

The pre-processor of an embodiment is configured to determine a data offset of the at least one CRAMFS component, the data offset specifying an amount of memory to be allocated in the reorganized CRAMFS component for a header of the at least one CRAMFS component.

The pre-processor of an embodiment is configured to receive at least one resize list, wherein information of the resize list specifies at least one file that is to be increased in size in the reorganized CRAMFS component, wherein the at least one file is within at least one component of the reorganized CRAMFS component.

The second position of an embodiment follows any unchanged data section of the at least one CRAMFS component.

The pre-processor of an embodiment is configured to generate an image information file that includes information of the modified image.

The byte-level differences between the CRAMFS component and the reorganized CRAMFS component of an embodiment are at a minimum and the reorganized CRAMFS component is functionally equivalent to a corresponding one of the at least one CRAMFS component.

The difference engine of an embodiment is configured to determine differences in content between a first version of a file and a second version of a file, wherein the first version and the second version each include corresponding versions of the image, wherein determining differences includes determining data differences between the modified image of the first version and the modified image of the second version.

The IRT of an embodiment includes a computer readable media including executable instructions which, when executed in a processing system, reorganize static file system images by receiving an image that includes at least one component, wherein the at least one component includes a compressed read-only memory file system (CRAMFS) format. The executed instructions of an embodiment reorganize static file system images by determining any changed sections of the at least one component. The executed instructions of an embodiment reorganize static file system images by generating at least one reorganized component by reorganizing the at least one component, the reorganizing including moving at least one changed section of any changed sections from a first position to a second position in the component. The executed instructions of an embodiment reorganize static file system images by generating a modified image that includes the at least one reorganized component.

The SFS differencing and updating of an embodiment includes a device for differencing static file system images. The device of an embodiment comprises a receiver that receives images of a static file system, the images including an original image and a new image. The device of an embodiment also comprises a pre-processor that divides the original image into numerous original sections and divides the new image into numerous new sections. The device of an embodiment comprises a dependency generator that identifies dependency alignments between the plurality of original sections and the plurality of new sections. The device of an embodiment comprises a difference engine that generates a delta file for at least one of the new sections, wherein the delta file includes differences between the at least one new sections and at least one of the original sections on which the at least one new sections depends.

The device of an embodiment further comprises a packaging engine that assembles the delta file for the at least one of the new sections according to an update sequence.

The SFS differencing and updating of an embodiment includes a method comprising splitting blocks of SFS images into portions based on block information and image structure information, wherein the SFS images include original images and new images. The method of an embodiment comprises performing portion-level differencing by generating a delta file for a new portion of the new image, wherein the delta file includes information of differences between the new portion and one of more corresponding original portions of the original image. The method of an embodiment comprises transferring the delta file to a client device. The method of an embodiment comprises updating a target SFS image of the client device using information of the delta file by reconstructing all portions of the new image in a device block in random access memory of the host device and writing the device block into read-only memory of the host device.

The SFS differencing and updating of an embodiment includes a method comprising receiving images of a static file system, the images including an original image and a new image. The method of an embodiment comprises dividing the original image into a plurality of original sections and divides the new image into a plurality of new sections. The method of an embodiment comprises identifying dependency alignments between the plurality of original sections and the plurality of new sections. The method of an embodiment comprises generating a delta file for at least one of the new sections, wherein the delta file includes differences between the at least one new sections and at least one of the original sections on which the at least one new sections depends.

The SFS differencing and updating of an embodiment includes a system comprising a receiver that receives images of a static file system, the images including an original image and a new image. The system of an embodiment comprises a pre-processor coupled to the receiver that divides the original image into a plurality of original sections and divides the new image into a plurality of new sections. The system of an embodiment comprises a dependency generator coupled to the pre-processor that identifies dependency alignments between the plurality of original sections and the plurality of new sections. The system of an embodiment comprises a difference engine coupled to the dependency generator that generates a delta file for at least one of the plurality of new sections that is different from at least one of the plurality of original sections on which the at least one new section depends, the delta file including coded differences between a new section and one or more original sections. The system of an embodiment comprises a packaging engine coupled to the difference engine that assembles the delta files into a delta package.

The system of an embodiment comprises an update engine in a portable device, wherein the portable device receives the delta package via at least one coupling, wherein the update engine assembles dependent original sections of the plurality of original sections hosted on the portable device, identifies at least one delta file of the delta package that corresponds to at least one of the dependent original sections, and reconstructs at least one new section that corresponds to the at least one delta file identified.

The update engine of an embodiment receives the delta package and verifies integrity of contents of at least one delta file of the delta package.

The update engine of an embodiment reconstructs the at least one new section in a first memory area of the portable device.

The first memory area of an embodiment is in random access memory (RAM).

The update engine of an embodiment continues identifying delta files of the delta package that correspond to at least one of the dependent original sections and reconstructing new sections that correspond to the delta files identified.

The update engine of an embodiment determines that all delta files of the delta package have been applied to the original sections hosted on the portable device and in response to the determination writes the reconstructed new sections to a second memory area of the portable device.

The update engine of an embodiment writes each block of the reconstructed new sections to a second memory area.

The second memory area of an embodiment is in read-only memory (ROM).

The SFS differencing and updating of an embodiment includes a method comprising receiving images of a static file system, the images including an original image and a new image, wherein the images include a plurality of blocks. The method of an embodiment comprises splitting the images by using information of the plurality of blocks to split the images into a plurality of portions. The method of an embodiment comprises determining differences between content of the images by determining differences between the plurality of portions of the original image and the new image. The method of an embodiment comprises generating a delta file that includes the differences for at least one portion.

The method of an embodiment comprises transferring the delta file to a portable wireless device that hosts the original image.

The method of an embodiment comprises receiving the delta file at a portable device via at least one coupling. The method of an embodiment comprises assembling dependent original portions of the plurality of original portions hosted on the portable device. The method of an embodiment comprises identifying at least one of the dependent original portions that corresponds to the delta file received. The method of an embodiment comprises reconstructing at least one new portion that corresponds to the at least one delta file identified.

The method of an embodiment comprises assembling a plurality of the delta files into a delta package.

The method of an embodiment comprises transferring the delta package to a portable wireless device that hosts the original image.

The method of an embodiment comprises receiving the delta package at the portable device via at least one coupling. The method of an embodiment comprises assembling dependent original portions of the plurality of original portions hosted on the portable device. The method of an embodiment comprises identifying at least one delta file of the delta package that corresponds to at least one of the dependent original portions. The method of an embodiment comprises reconstructing at least one new portion that corresponds to the at least one delta file identified.

The SFS differencing and updating of an embodiment includes computer readable media including executable instructions which, when executed in a processing system, determine differences between images by receiving images of a static file system, the images including an original image and a new image, wherein the images include a plurality of blocks. The media further determines differences between images by splitting the images by using information of the plurality of blocks to split the images into a plurality of portions. The media further determines differences between images by determining differences between content of the images by determining differences between the plurality of portions of the original image and the new image. The media further determines differences between images by generating a delta file that includes the differences for at least one portion.

The media further determines differences between images by transferring the delta file to a portable wireless device that hosts the original image.

The media further determines differences between images by receiving the delta file at a portable device via at least one coupling. The media further determines differences between images by assembling dependent original portions of the plurality of original portions hosted on the portable device. The media further determines differences between images by identifying at least one of the dependent original portions that corresponds to the delta file received. The media further determines differences between images by reconstructing at least one new portion that corresponds to the at least one delta file identified.

The media further determines differences between images by assembling a plurality of the delta files into a delta package.

The media of an embodiment may transfer the delta package to a portable wireless device that hosts the original image.

The media of an embodiment receives the delta package at the portable device via at least one coupling. The media of an embodiment assembles dependent original portions of the plurality of original portions hosted on the portable device. The media of an embodiment identifies at least one delta file of the delta package that corresponds to at least one of the dependent original portions. The media of an embodiment reconstructs at least one new portion that corresponds to the at least one delta file identified.

Aspects of the IRT and SFS differencing and updating described above may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the IRT and SFS differencing and updating include: microcontrollers with memory (such as electronically erasable programmable read only memory (EEPROM)), embedded microprocessors, firmware, software, etc. Furthermore, aspects of the IRT and SFS differencing and updating may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the IRT and SFS differencing and updating is not intended to be exhaustive or to limit the invention to the precise form disclosed. While specific embodiments of, and examples for, the IRT and SFS differencing and updating are described herein for illustrative purposes, various equivalent modifications are possible within the scope of the IRT and SFS differencing and updating, as those skilled in the relevant art will recognize. The teachings of the IRT and SFS differencing and updating provided herein can be applied to other processing systems and communication systems, not only for the IRT and SFS differencing and updating systems described above.

The elements and acts of the various embodiments described above can be combined to provide further embodiments. These and other changes can be made to the IRT and SFS differencing and updating in light of the above detailed description. Furthermore, aspects of the IRT and SFS differencing and updating can be modified, if necessary, to employ the systems, functions and concepts of the various patents and applications described above to provide yet further embodiments of the IRT and SFS differencing and updating.

In general, in the following claims, the terms used should not be construed to limit the IRT and SFS differencing and updating to the specific embodiments disclosed in the specification and the claims, but should be construed to include all processing systems that operate under the claims to provide file pre-processing, differencing and updating. Accordingly, the IRT and SFS differencing and updating is not limited by the disclosure, but instead the scope of the IRT and SFS differencing and updating is to be determined entirely by the claims.

While certain aspects of the IRT and SFS differencing and updating are presented below in certain claim forms, the inventors contemplate the various aspects of the IRT and SFS differencing and updating in any number of claim forms. For example, while only one aspect of the IRT and SFS differencing and updating is recited as embodied in computer-readable medium, other aspects may likewise be embodied in computer-readable medium. Accordingly, the inventors reserve the right to add additional claims after filing the application to pursue such additional claim forms for other aspects of the IRT and SFS differencing and updating.

What is claimed is:

1. A method comprising:
   receiving a first version of an image that includes at least one component, wherein the at least one component includes a plurality of compressed read-only memory file system (CRAMFS) format components;
   determining any changed sections of the at least one component including determining any changed sections of a first CRAMFS component of the first version;
   determining any changed sections of a second CRAMFS component of the first version;
   generating at least one reorganized component by reorganizing the first CRAMFS component to generate a first reorganized CRAMFS component and the second CRAMFS component to generate a second reorganized CRAMFS component, the reorganizing including moving at least one changed section of any changed sections from a first position to a second position in the at least one component;
   generating a modified first version of the image that includes the first reorganized CRAMFS component and the second reorganized CRAMFS component;
   receiving a second version of the image;
   determining any changed sections of a first CRAMFS component of the second version and generating a third reorganized CRAMFS component;
   determining any changed sections of a second CRAMFS component of the second version and generating a fourth reorganized CRAMFS component; and
   generating a modified second version that includes the third reorganized CRAMFS component and the fourth reorganized CRAMFS component.

2. The method of claim 1, wherein the image is a static file system image.

3. The method of claim 1, further comprising receiving at least one parameter of a CRAMFS component, wherein the at least one parameter includes at least one of a starting address of the CRAMFS component, a size of the CRAMFS component, and a data offset of the CRAMFS component.

4. The method of claim 1, further comprising determining a data offset of a CRAMFS component, the data offset specifying an amount of memory to be allocated in a reorganized CRAMFS component for a header of the CRAMFS component.

5. The method of claim 1, further comprising receiving at least one resize list, wherein information of the resize list specifies at least one file that is to be increased in size in a reorganized CRAMFS component, wherein the at least one file is within at least one component of the reorganized CRAMFS component.

6. The method of claim 1, wherein the second position follows any unchanged data section of a CRAMFS component.

7. The method of claim 1, further comprising generating an image information file that includes information of a modified image.

8. The method of claim 1, further comprising converting the image to a binary file simultaneous with or subsequent to receiving the image.

9. The method of claim 1, further comprising minimizing the byte-level differences between a CRAMFS component and a reorganized CRAMFS component and wherein the reorganized CRAMFS component is functionally equivalent to a corresponding CRAMFS component.

10. The method of claim 1, further comprising determining differences in content between a first version of a file and a second version of a file, wherein the first version and the second version each include corresponding versions of the image, wherein determining differences includes determining data differences between the modified image of the first version and the modified image of the second version.

11. The method of claim 1, further comprising receiving a first image information file of the first image.

12. The method of claim 1, further comprising determining differences in content between the first version and the second version by determining data differences between the modified first version and the modified second version.

13. The method of claim 12, further comprising generating a difference file that includes the differences identified between the first version and the second version.

14. The method of claim 1, further comprising:
receiving a third version of the image;
determining any changed sections of a CRAMFS component of the third version and generating a fifth reorganized CRAMFS component by moving the changed sections;
generating a modified third version that includes the fifth reorganized CRAMFS component.

15. The method of claim 1, further comprising receiving a second image information file of the second image.

16. The method of claim 14, further comprising determining differences in content between the second version and the third version by determining data differences between the modified second version and the modified third version.

17. The method of claim 1, further comprising:
determining any changed sections of at least one additional CRAMFS component of the first version, wherein the at least one additional CRAMFS component is in addition to the first CRAMFS component and the second CRAMFS component;
generating at least one additional reorganized CRAMFS component by moving the changed sections of the at least one additional CRAMFS component, wherein the generating a modified first version includes generating the modified first version to include the first reorganized CRAMFS component, the second reorganized CRAMFS component, and the at least one additional reorganized CRAMFS component.

18. The method of claim 1, further comprising determining differences in content between the first version and the second version by determining data differences between the modified first version and the modified second version.

19. A method comprising:
receiving a first version of an image that is a static file system image including a plurality of compressed read-only memory file system (CRAMFS) format components;
determining any changed sections of a first CRAMFS component of the first version;
determining any changed sections of a second CRAMFS component of the first version;
generating a modified first version by reorganizing the first CRAMFS component to generate a first reorganized CRAMFS component and the second CRAMFS component to generate a second reorganized CRAMFS component, wherein reorganizing includes moving at least one changed data section of each component from a first position to a second position in a corresponding component;
receiving at least one other version of the image;
determining any changed sections of a first CRAMFS component of the at least one other version and generating a third reorganized CRAMFS component;
determining any changed sections of a second CRAMFS component of the at least one other version and generating a fourth reorganized CRAMFS component;
generating at least one other modified version by reorganizing at least one component of each of the at least one other version, the at least one other modified version including the third reorganized CRAMFS component and the fourth reorganized CRAMFS component; and
determining differences in content between the first version and the at least one other version by determining content differences between the modified first version and the at least one other modified version.

20. The method of claim 19, further comprising generating a difference file that includes the differences identified between the first version and the at least one other modified version.

21. The method of claim 19, wherein the reorganizing further comprises:
identifying at least one changed data section of each version of the image, wherein the at least one changed data section includes a data section having changed content in at least one file of the component; and
repositioning the at least one changed data section to at least one position that follows all unchanged data sections of the corresponding component.

22. A computing device for differencing static file system images, comprising:
at least one processor coupled to a memory;
a receiver that receives images of a static file system, the images including a plurality of compressed read-only memory file system (CRAMFS) format components; and
a pre-processor coupled to the receiver and the at least one processor, the pre-processor configured to:
determine any changed sections of a first CRAMFS component of a first image and generate a first reorganized CRAMFS component,
determine any changed sections of a second CRAMFS component of the first image;
determine any changed sections of a first CRAMFS component of a second image,
determine any changed sections of a second CRAMFS component of the second image,
generate a first reorganized CRAMFS component by reorganizing the first CRAMFS component,
generate a second reorganized CRAMFS component by reorganizing the second CRAMFS component of the first image,
generate a third reorganized CRAMFS component by reorganizing the first CRAMFS component of the second image,
generate a fourth reorganized CRAMFS component by reorganizing the second CRAMFS component of the second image, the reorganizing including moving at least one changed section of any changed sections from a first position to a second position in a corresponding CRAMFS component, and generate a modified first version of the image that includes the first and second reorganized CRAMFS components and a modified second version of the image that includes third and fourth reorganized CRAMFS components.

23. The device of claim 22, wherein the pre-processor is further configured to receive at least one parameter of a CRAMFS component, wherein the at least one parameter includes at least one of a starting address of the CRAMFS component, a size of the CRAMFS component, and a data offset of the CRAMFS component.

24. The device of claim 22, wherein the pre-processor is further configured to determine a data offset of a CRAMFS component, the data offset specifying an amount of memory to be allocated in a reorganized CRAMFS component for a header of the CRAMFS component.

25. The device of claim 22, wherein the pre-processor is further configured to receive at least one resize list, wherein information of the resize list specifies at least one file that is to be increased in size in a reorganized CRAMFS component, wherein the at least one file is within at least one component of the reorganized CRAMFS component.

26. The device of claim 22, wherein the second position follows any unchanged data section of the CRAMFS component.

27. The device of claim 22, wherein the pre-processor is further configured to generate an image information file that includes information of at least one of the modified images.

28. The device of claim 22, wherein the byte-level differences between a CRAMFS component and a reorganized CRAMFS component are minimized and the reorganized CRAMFS component is functionally equivalent to a corresponding CRAMFS component.

29. The device of claim 22, wherein the pre-processor is further configured to determine differences in content between a first version of a file and a second version of a file, wherein the first version and the second version each include corresponding versions of the image, wherein determining differences includes determining data differences between the modified image of the first version and the modified image of the second version.

30. A computing system comprising:
at least one processor coupled to a memory;
a receiver that receives a first version of an image and at least one other version of the image, wherein the image is a static file system image, the image including a plurality of CRAMFS components;
a pre-processor coupled to the receiver and the at least one processor, the pre-processor configured to:
  determine any changed sections of a first CRAMFS component of the first version and generate a first reorganized CRAMFS component;
  determine any changed sections of a second CRAMFS component of the first version and generate a second reorganized CRAMFS component;
  determine any changed sections of a first CRAMFS component of the at least one other version and generate a third reorganized CRAMFS component;
  determine any changed sections of a second CRAMFS component of the at least one other version and generating a fourth reorganized CRAMFS component;
  generate a modified first version by reorganizing at least one CRAMFS component of the first version, the modified first version including the first reorganized CRAMFS component and second reorganized CRAMFS component, wherein reorganizing includes moving at least one changed data section of any changed sections of the at least one CRAMFS component from a first position to a second position in the at least one CRAMFS component, generate at least one other modified version by reorganizing at least one component of each of the at least one other version, the at least one other modified version including the third reorganized CRAMFS component and the fourth reorganized CRAMFS component; and
a difference engine coupled to the pre-processor, the difference engine configured to determine differences in content between the first version and the at least one other version by determining content differences between the modified first version and the at least one other modified version.

31. The system of claim 30, wherein the pre-processor is further configured to receive at least one parameter of a CRAMFS component, wherein the at least one parameter includes at least one of a starting address of the CRAMFS component, a size of the CRAMFS component, and a data offset of the CRAMFS component.

32. The system of claim 30, wherein the pre-processor is further configured to determine a data offset of a CRAMFS component, the data offset specifying an amount of memory to be allocated in a reorganized CRAMFS component for a header of the CRAMFS component.

33. The system of claim 30, wherein the pre-processor is further configured to receive at least one resize list, wherein information of the resize list specifies at least one file that is to be increased in size in a reorganized CRAMFS component, wherein the at least one file is within at least one component of the reorganized CRAMFS component.

34. The system of claim 30, wherein the second position follows any unchanged data section of a CRAMFS component.

35. The system of claim 30, wherein the pre-processor is further configured to generate an image information file that includes information of a modified image.

36. The system of claim 30, further comprising minimized byte-level differences between a CRAMFS component and a reorganized CRAMFS component and the reorganized CRAMFS component is functionally equivalent to a corresponding CRAMFS component.

37. The system of claim 30, wherein the difference engine is further configured to determine differences in content between a first version of a file and a second version of a file, wherein the first version and the second version each include corresponding versions of the image, wherein determining differences includes determining data differences between the modified image of the first version and the modified image of the second version.

38. A computer readable storage media including executable instructions which, when executed in a processing system, reorganize static file system images by:
receiving a first version of an image that includes at least one component, wherein the at least one component includes a plurality of compressed read-only memory file system (CRAMFS) format components;
determining any changed sections of the at least one component including determining any changed sections of a first CRAMFS component of the first version;
determining any changed sections of a second CRAMFS component of the first version;

generating at least one reorganized component by reorganizing the first CRAMFS component to generate a first reorganized CRAMFS component and the second CRAMFS component to generate a second reorganized CRAMFS component, the reorganizing including moving at least one changed section of any changed sections from a first position to a second position in the at least one component;

generating a modified first version of the image that includes the first reorganized CRAMFS component and the second reorganized CRAMFS component;

receiving a second version of the image;

determining any changed sections of a first CRAMFS component of the second version and generating a third reorganized CRAMFS component;

determining any changed sections of a second CRAMFS component of the second version and generating a fourth reorganized CRAMFS component; and generating a modified second version that includes the third reorganized CRAMFS component and the fourth reorganized CRAMFS component.

* * * * *